United States Patent
Sugioka et al.

(10) Patent No.: US 8,970,750 B2
(45) Date of Patent: Mar. 3, 2015

(54) IMAGE OUTPUTTING APPARATUS, IMAGE OUTPUTTING METHOD, IMAGE PROCESSING APPARATUS, IMAGE PROCESSING METHOD, PROGRAM, DATA STRUCTURE AND IMAGING APPARATUS

(75) Inventors: Tatsuya Sugioka, Tokyo (JP); Hiroshi Shiroshita, Kanagawa (JP); Miho Ozawa, Kanagawa (JP); Hiroki Kihara, Kanagawa (JP); Kenichi Maruko, Kanagawa (JP); Tatsuo Shinbashi, Tokyo (JP); Kazuhisa Funamoto, Kanagawa (JP); Hideyuki Matsumoto, Tokyo (JP); Takayuki Toyama, Kanagawa (JP); Hayato Wakabayashi, Tokyo (JP); Naohiro Koshisaka, Hokkaido (JP); Shigetoshi Sasaki, Hokkaido (JP); Masato Tamori, Hokkaido (JP)

(73) Assignee: Sony Corporation, Tokyo (JP)

( * ) Notice: Subject to any disclaimer, the term of this patent is extended or adjusted under 35 U.S.C. 154(b) by 594 days.

(21) Appl. No.: 13/242,144

(22) Filed: Sep. 23, 2011

(65) Prior Publication Data
US 2012/0120289 A1 May 17, 2012

(30) Foreign Application Priority Data
Nov. 12, 2010 (JP) ................................. 2010-254261

(51) Int. Cl.
*H04N 3/14* (2006.01)
*H04N 5/335* (2011.01)
(Continued)

(52) U.S. Cl.
CPC ............ *G06F 13/385* (2013.01); *G06T 1/0007* (2013.01); *H04N 1/00307* (2013.01); *H04N 2201/0084* (2013.01); *G06T 2210/32* (2013.01); *H04N 5/378* (2013.01)
USPC ............................. 348/294; 714/701; 714/746

(58) Field of Classification Search
USPC .................... 348/294; 714/701, 746; 370/474
See application file for complete search history.

(56) References Cited

U.S. PATENT DOCUMENTS

2003/0039409 A1* 2/2003 Ueda ............................. 382/298
2009/0201949 A1 8/2009 Sunahara

FOREIGN PATENT DOCUMENTS

| JP | 2-257782 | 10/1990 |
|----|----------|---------|
| JP | 2006-340228 | 12/2006 |

(Continued)

OTHER PUBLICATIONS

U.S. Appl. No. 13/277,380, filed Oct. 20, 2011, Funamoto, et al.
(Continued)

*Primary Examiner* — Paul Berardesca
(74) *Attorney, Agent, or Firm* — Oblon, McClelland, Maier & Neustadt, L.L.P.

(57) ABSTRACT

An image outputting apparatus includes a header production section for producing a header including header information formed from first and second frame information regarding whether pixel data included in a payload are of first and last lines of one frame, respectively, first line information regarding whether or not the pixel data included in the payload are valid, and second line information regarding a line number of a line formed from the pixel data included in the payload, and an error detection code for use for detection of an error of the header information. A packet production section produces a packet which includes, in the payload thereof, pixel data for one line which configure an image obtained by imaging by an imaging section and to which the header is added. An outputting section outputs the produced packet to an image processing apparatus.

21 Claims, 30 Drawing Sheets

(51) Int. Cl.
*G06F 13/38* (2006.01)
*G06T 1/00* (2006.01)
H04N 1/00 (2006.01)
H04N 5/378 (2011.01)

(56) References Cited

FOREIGN PATENT DOCUMENTS

| JP | 2006340228 | * 12/2006 | ............... H04N 7/18 |
|----|------------|-----------|---------------------------|
| JP | 2008-252739 | 10/2008 | |
| JP | 2009-65399 | 3/2009 | |
| JP | 2009-156992 | 7/2009 | |
| JP | 2010-213011 | 9/2010 | |

OTHER PUBLICATIONS

International Search Report issued Feb. 14, 2012, in PCT/JP2011/076144, filed Nov. 11, 2011 (with English-language translation).

Serial ATA, "High Speed Serialized AT Attachment", Revision 1.0a, Jan. 7, 2003, pp. 1-310.

* cited by examiner

FIG. 7

| LARGE ITEM | SMALL ITEM | INFORMATION AMOUNT | SUBSTANCE |
|---|---|---|---|
| FRAME INFORMATION | FRAME START | 1BIT | INDICATE FRAME TOP (EXAMPLE: FIRST LINE) |
| | FRAME END | 1BIT | INDICATE FRAME END (EXAMPLE: REAR DUMMY FRONT LINE) |
| LINE INFORMATION | LINE VALID | 1BIT | INDICATE WHETHER LINE IS VALID OR INVALID |
| | LINE NUMBER | 13BITS | INDICATE LINE NUMBER |
| OTHERS | RESERVED | 32BITS | RESERVED FOR FUTURE SCALABILITY |
| | HEADER ECC | 18BYTES | ECC FOR HEADER INFORMATION |

FIG. 8

| Byte | Bit | Contents |
|---|---|---|
| H7 | 63 | Frame Start |
| | 62 | Frame End |
| | 61 | Line Valid |
| | 60 | Line Number[12] |
| | 59 | Line Number[11] |
| | 58 | Line Number[10] |
| | 57 | Line Number[9] |
| | 56 | Line Number[8] |
| H6 | 55 | Line Number[7] |
| | 54 | Line Number[6] |
| | 53 | Line Number[5] |
| | 52 | Line Number[4] |
| | 51 | Line Number[3] |
| | 50 | Line Number[2] |
| | 49 | Line Number[1] |
| | 48 | Line Number[0] |

| Byte | Bit | Contents |
|---|---|---|
| H5 | 47 | Reserved[31] |
| | 46 | Reserved[30] |
| | 45 | Reserved[29] |
| | 44 | Reserved[28] |
| | 43 | Reserved[27] |
| | 42 | Reserved[26] |
| | 41 | Reserved[25] |
| | 40 | Reserved[24] |
| H4 | 39 | Reserved[23] |
| | 38 | Reserved[22] |
| | 37 | Reserved[21] |
| | 36 | Reserved[20] |
| | 35 | Reserved[19] |
| | 34 | Reserved[18] |
| | 33 | Reserved[17] |
| | 32 | Reserved[16] |

| Byte | Bit | Contents |
|---|---|---|
| H3 | 31 | Reserved[15] |
| | 30 | Reserved[14] |
| | 29 | Reserved[13] |
| | 28 | Reserved[12] |
| | 27 | Reserved[11] |
| | 26 | Reserved[10] |
| | 25 | Reserved[9] |
| | 24 | Reserved[8] |
| H2 | 23 | Reserved[7] |
| | 22 | Reserved[6] |
| | 21 | Reserved[5] |
| | 20 | Reserved[4] |
| | 19 | Reserved[3] |
| | 18 | Reserved[2] |
| | 17 | Reserved[1] |
| | 16 | Reserved[0] |

| Byte | Bit | Contents | |
|---|---|---|---|
| H1 | 15 | CRC[15] | X^15 |
| | 14 | CRC[14] | X^14 |
| | 13 | CRC[13] | X^13 |
| | 12 | CRC[12] | X^12 |
| | 11 | CRC[11] | X^11 |
| | 10 | CRC[10] | X^10 |
| | 9 | CRC[9] | X^9 |
| | 8 | CRC[8] | X^8 |
| H0 | 7 | CRC[7] | X^7 |
| | 6 | CRC[6] | X^6 |
| | 5 | CRC[5] | X^5 |
| | 4 | CRC[4] | X^4 |
| | 3 | CRC[3] | X^3 |
| | 2 | CRC[2] | X^2 |
| | 1 | CRC[1] | X^1 |
| | 0 | CRC[0] | X^0 |

FIG. 21

| PHY CONTROLLING CODE | APPLICATION | 8B10B SYMBOL CONFIGURATION | | | |
|---|---|---|---|---|---|
| IDLE CODE | SYMBOL GROUP (MARGIN PERIOD ETC.) FOR CONTINUING TO TOGGLE OUTPUT SIGNAL EXCEPT UPON PACKET TRANSMISSION | D00.0 | | | |
| START CODE | INDICATE START OF PACKET (LINE/H) | K28.5 | K27.7 | K28.2 | K27.7 |
| END CODE | INDICATE END OF PACKET (LINE/H) | K28.5 | K29.7 | K30.7 | K29.7 |
| PAD CODE | PADDING SYMBOL GROUP INSERTED TO FILL UP DIFFERENCE BETWEEN PIXEL DATA (PAYLOAD DATA) BAND AND PHY TRANSMISSION BAND | K23.7 | K28.4 | K28.6 | K28.7 |
| SYNC CODE | SYMBOL GROUP FOR ESTABLISHING BIT SYNCHRONISM OF I/F, 8B10B SYMBOL SYNCHRONISM | K28.5 | ANY** | ↓ | ↓ |
| DESKEW CODE | SYMBOL GROUP TO BE USED AS MARKING FOR ADJUSTING DATA SKEW BETWEEN LANES | K28.5 | ANY** | ↓ | ↓ |
| STANDBY CODE | SYMBOL GROUP FOR NOTIFYING RX SIDE THAT TX OUTPUT BECOMES HIGH-Z | K28.5 | ANY** | ↓ | ↓ |

FIG. 22

Control Symbol

| Code | 8B HGF_EDCBA | 10B abcdei_fghj | | memo |
|---|---|---|---|---|
| | | RD− | RD+ | |
| K23.7 | 11110111 | 1110101000 | 0001010111 | Used in Pad Code |
| K27.7 | 11111011 | 1101101000 | 0010010111 | Used in Start Code |
| K28.0 | 00011100 | 0011110100 | 1100001011 | Reserved |
| K28.1 | 00111100 | 0011111001 | 1100000110 | Reserved |
| K28.2 | 01011100 | 0011110101 | 1100001010 | Used in Start Code |
| K28.3 | 01111100 | 0011110011 | 1100001100 | Reserved |
| K28.4 | 10011100 | 0011110010 | 1100001101 | Used in Pad Code |
| K28.5 | 10111100 | 0011111010 | 1100000101 | Comma Character |
| K28.6 | 11011100 | 0011110110 | 1100001001 | Used in Pad Code |
| K28.7 | 11111100 | 0011111000 | 1100000111 | Used in Pad Code |
| K29.7 | 11111101 | 1011101000 | 0100010111 | Used in End Code |
| K30.7 | 11111110 | 0111101000 | 1000010111 | Used in End Code |

IMAGE OUTPUTTING APPARATUS, IMAGE OUTPUTTING METHOD, IMAGE PROCESSING APPARATUS, IMAGE PROCESSING METHOD, PROGRAM, DATA STRUCTURE AND IMAGING APPARATUS

BACKGROUND

This disclosure relates to an image outputting apparatus, an image outputting method, an image processing apparatus, an image processing method, a program, a data structure, and an imaging apparatus.

Together with enhancement of the picture quality and increase of the frame rate of an image sensor, the transmission capacity of data demanded for an interface of the image sensor with a DSP (Digital Signal Processor) which processes an image picked up by the image sensor is increasing.

In order to satisfy such a demand as described above, for example, such techniques as improvement of the clock frequency of an interface and reduction of the voltage for a signal are adopted. However, the techniques increase the difficulty in production of a sampling timing on the DSP side and make it difficult to transmit data correctly.

Serial ATA: High Speed Serialized AT Attachment Revision 1.0a 7 Jan. 2003 is available as a related art document.

SUMMARY

Incidentally, as a standard for increasing the transmission capacity between chips, PCI-Express, Serial ATA and so forth are available. PCI stands for peripheral component interconnect and ATA stands for advanced technology attachment. In PCI-Express or Serial ATA, a high transmission capacity is implemented by enhancement in performance of a CDR (Clock Data Recovery) circuit or an equalizer. Further, for an interface between chips for a portable telephone set, the MIPI (Mobile Industry Processor Interface) standard is available.

Such standards as mentioned above involve many redundant functions to an interface between an image sensor and a DSP from such a reason that they are prepared as interface standards for more general purposes like an interface between CPUs (Central Processing Units). If it is tried to adopt such standards as mentioned above for an interface between an image sensor and a DSP, also functions which are not required for the interface between an image sensor and a DSP are incorporated. This increases the circuit area, power consumption and cost for incorporation.

Particularly, the influence of incorporation of a circuit for a countermeasure against a transmission error is significant. In such standards as MIPI, a chip on the reception side issues a request to re-send data to a chip on the transmission side as a countermeasure against a transmission error. However, this gives rise to increase of the circuit area and so forth to an image sensor which is a device in which it is normally difficult to use an advanced/fine transistor because importance is attached to an imaging characteristic. In the standards such as MIPI, since the chip on the reception side issues a request to re-send data to the chip of the transmission side, a comparatively large buffer is prepared as a re-sending buffer in the chip on the transmission side.

Further, when a transmission error occurs, if this is covered by re-sending of the data, then the real-time property is damaged. This makes it difficult to transmit image data at a high frame rate.

Therefore, it is desirable to provide an image outputting apparatus, an image outputting method, an image processing apparatus, an image processing method, a program, a data structure, and an imaging apparatus by which image data can be transmission efficiently.

According to an embodiment of the disclosed technology, there is provided an image outputting apparatus including an imaging section, and a header production section adapted to produce a header including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. The image outputting apparatus further includes a packet production section adapted to produce a packet which includes, in the payload thereof, pixel data for one line which configure an image obtained by imaging by the imaging section and to which the header is added, and an outputting section adapted to output the packet produced by the packet production section to an image processing apparatus.

Each of the first frame information, second frame information and first line information may be 1-bit information, and the second line information may be 13-bit information.

The header production section may produce the header which includes a plurality of sets of the header information and the error detection code.

The image outputting apparatus may further include an addition section adapted to add, to the front of the packet produced by the packet production section, a start code representative of a start position of the packet and add, to the tail end of the packet, an end code representative of an end position of the packet.

In this instance, the addition section may add a padding code to the payload of the packet when a transmission rate of data through a transmission line between the image outputting apparatus and the image processing apparatus is higher than a transmission rate of the pixel data at which the pixel data are outputted from the imaging section.

Further, the addition section may add a skew code, which is to be used by the image processing apparatus, next to the end code in order to assure synchronism of data of the packet transmitted through a plurality of transmission lines, and the outputting section may output data of the packet to which the start code, end code and skew code are added simultaneously to the image processing apparatus using the plural transmission lines.

Further, in this instance, the addition section may combine, from among a plurality of symbols which are known information and are each configured from a sequence of a predetermined number of bits, four symbols of three kinds of the symbols to produce the start code and the end code and add the start code and the end code to the packet, combine, from among the plural symbols, four symbols of the four kinds of the symbols to produce the padding code and add the padding code to the payload of the packet, and combine predetermined two ones of the plural symbols to produce the skew code and add the skew code to the packet. In this instance, the addition section may produce the start code, end code and skew code such that the symbols of the start code, end code and skew code include those ones which are of the same kind.

The image outputting apparatus may further include a distribution section adapted to allocate the data of the packet produced by the packet production section to the plural transmission lines, a number of such addition sections and outputting sections equal to the number of the transmission lines being provided corresponding to the transmission lines.

Further, according to the first embodiment, there is provided an image outputting method including picking up an image, and producing a header including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. The image outputting method further includes producing a packet which includes, in the payload thereof, pixel data for one line which configure an image obtained by the imaging and to which the header is added, and outputting the produced packet to an image processing apparatus.

Furthermore, according to the first embodiment, there is provide a program for causing a computer to execute a process including picking up an image, and producing a header including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. The process further includes producing a packet which includes, in the payload thereof, pixel data for one line which configure an image obtained by the imaging and to which the header is added, and outputting the produced packet to an image processing apparatus.

According to the first embodiment, also there is provided a data structure of transmission data to be used for transmission of data including pixel data for one line which configure an image obtained by imaging, including a packet wherein a header including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information is added to the payload which includes pixel data for one line which configure an image obtained by imaging, a start code added to a top of the packet and representative of a start position of the packet, an end code added to a tail end of the packet and representative of an end position of the packet, and a skew code added next to the end code and used by an image processing apparatus which receives the data of the packet in order to assure synchronism of the data of the packet.

In the first embodiment of the disclosed technology, a header is produced including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. Further, a packet is produced which includes, in the payload thereof, pixel data for one line which configure an image obtained by imaging and to which the header is added. Then, the produced packet is outputted to the image processing apparatus.

According to a second embodiment of the disclosed technology, there is provided an image processing apparatus including a reception section adapted to receive a packet produced by an image outputting apparatus provided in the same apparatus and outputted from the image outputting apparatus, the packet including a header added to a payload including image data for one line which configure an image obtained by imaging by an imaging section of the image outputting apparatus, the header including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. The image processing apparatus further includes an image processing section adapted to process the image configured from lines each formed from the pixel data included in the payload of the packet received by the reception section.

The header may include a plurality of sets of the header information and the error detection code. The image processing apparatus may further include an error detection section adapted to detect an error of the header information in each of the sets based on the error detection code which configures the set to which the header information belongs, and a production section adapted to produce the image of one frame formed from the pixel data included in the payload based on the header information from which an error is not detected by the error detection section. The image processing section may process the image produced by the production section.

A start code representative of a start position of the packet may be added to the top of the packet while an end code representative of an end position of the packet is added to the tail end of the packet, and the reception section may receive data after the start code is received until the end code is received as the data of the packet.

In this instance, the image processing apparatus may further include a removal section adapted to remove the start code and the end code and remove a padding code added to the payload by the image outputting apparatus when a transmission rate of a transmission line between the image outputting apparatus and the image processing apparatus is higher than a transmission rate of pixel data of the image outputted from the imaging section of the image outputting apparatus.

Data of the packet having a skew code added next to the end code thereof such that the start code, end code and skew code are added to the packet may be outputted simultaneously using a plurality of such transmission lines from the image outputting apparatus. The image processing apparatus may further include a correction section adapted to correct a displacement in reception timing of the data received by the reception section based on the skew code. Such reception sections, correction sections and removal sections equal to the transmission lines in number are provided corresponding to the transmission lines. In this instance, by the image outputting apparatus, from among a plurality of symbols which are known information and are each configured from a sequence of a predetermined number of bits, four symbols of three kinds of the symbols may be combined to produce the start code and the end code and add the start code and the end code to the packet; from among the plural symbols, four symbols of the four kinds of the symbols may be combined to produce the padding code and add the padding code to the payload of the packet; and predetermined two ones of the plural symbols may be combined to produce the skew code and add the skew code to the packet.

By the image outputting apparatus, the start code, end code and skew code may be produced such that the symbols of the start code, end code and skew code include those ones which are of the same kind.

Further, according to the second embodiment, there is provided an image processing method for an image processing apparatus, including receiving a packet produced by an image outputting apparatus provided in the same apparatus in which the image processing apparatus is provided and outputted from the image outputting apparatus, the packet including a header added to a payload including image data for one line which configure an image obtained by imaging by an imaging section of the image outputting apparatus, the header including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. The image processing method further includes processing the image configured from lines each formed from the pixel data included in the payload of the received packet.

Furthermore, according to the second embodiment, there is provided a program for causing a computer to execute a process including receiving a packet produced by an image outputting apparatus provided in the same apparatus in which an image processing apparatus is provided and outputted from the image outputting apparatus, the packet including a header added to a payload including image data for one line which configure an image obtained by imaging by an imaging section of the image outputting apparatus, the header including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. The process further includes processing the image configured from lines each formed from the pixel data included in the payload of the received packet.

In the second embodiment of the disclosed technology, a packet is received which is produced by an image outputting apparatus provided in the same apparatus in which the image processing apparatus is provided and outputted from the image outputting apparatus. The packet includes a header added to a payload including image data for one line which configure an image obtained by imaging by an imaging section of the image outputting apparatus. The header includes header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. Then, the image configured from lines each formed from the pixel data included in the payload of the received packet is processed.

According to a third embodiment of the disclosed technology, there is provided an imaging apparatus including an image outputting apparatus, and an image processing apparatus. The image outputting apparatus includes an imaging section, and a header production section adapted to produce a header including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. The image outputting apparatus further includes a packet production section adapted to produce a packet which includes, in the payload thereof, pixel data for one line which configure an image obtained by imaging by the imaging section and to which the header is added, and an outputting section adapted to output the packet produced by the packet production section to the image processing apparatus. The image processing apparatus includes a reception section adapted to receive the packet, and an image processing section adapted to process the image configured from lines each formed from the pixel data included in the payload of the packet received by the reception section.

In the third embodiment of the disclosed technology, the image outputting apparatus produces a header including header information formed from first frame information representative of whether or not pixel data included in a payload are pixel data of a first line of one frame, second frame information representative of whether or not the pixel data included in the payload are pixel data of a last line of one frame, first line information representative of whether or not the pixel data included in the payload are data of valid pixels, and second line information representative of a line number of a line formed from the pixel data included in the payload, and an error detection code to be used for detection of an error of the header information. Further, the image outputting apparatus produces a packet which includes, in the payload thereof, pixel data for one line which configure an image obtained by imaging and to which the header is added. Then, the image outputting apparatus outputs the produced packet to the image processing apparatus. On the other hand, the image processing apparatus receives the packet, and processes the image configured from lines each formed from the pixel data included in the payload of the received packet.

In summary, with the image outputting apparatus, image outputting method, image processing apparatus, image processing method, programs, data structure and imaging apparatus, image data can be transmitted efficiently.

BRIEF DESCRIPTION OF THE DRAWINGS

FIG. 7 is a view illustrating the substance and the information amount of header information;

FIG. 8 is a view illustrating an example of a bit array;

FIG. 21 is a view illustrating an example of controlling codes;

FIG. 22 is a view illustrating values of K Character;

DETAILED DESCRIPTION OF THE PREFERRED EMBODIMENT

<Example of the Configuration of the Transmission System>

Figure 1:
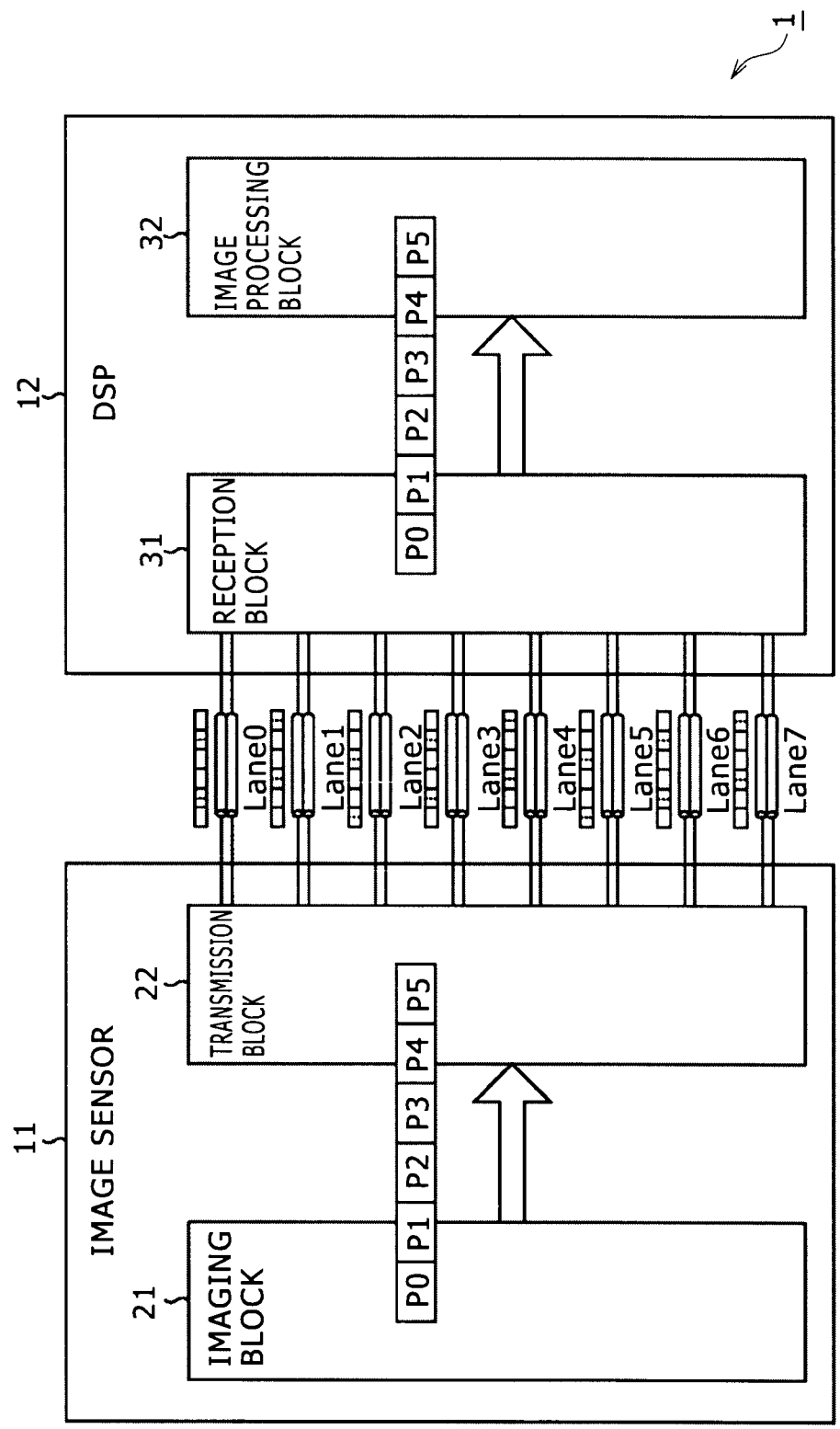
FIGS. 1, 2 and 3 are block diagrams showing first, second and third examples of a configuration of a transmission system, respectively.

FIG. 1 shows a first example of a configuration of a transmission system according to an embodiment of the disclosed technology.

Referring to FIG. 1, the transmission system 1 shown includes an image sensor 11 and a DSP 12. The image sensor 11 and the DSP 12 are configured from LSIs (Large Scale Integrated Circuits) different from each other and are provided in the same imaging apparatus having an imaging function such as a digital camera or a portable telephone set. The image sensor 11 includes an imaging block 21 and one transmission block 22, and the DSP 12 includes one reception block 31 and an image processing block 32.

The imaging block 21 of the image sensor 11 includes an imaging element such as a CMOS (Complementary Metal Oxide Semiconductor) imaging element and carries out photoelectric conversion of light received through a lens. Further, the imaging block 21 carries out A/D conversion and so forth of the signal obtained by photoelectric conversion and outputs pixel data, which configure an image of one frame, in order one by one pixel data to the transmission block 22.

The transmission block 22 allocates data of pixels supplied thereto from the imaging block 21, for example, in the order in which the data are supplied from the imaging block 21, to a plurality of transmission lines and transmits the data in parallel to the DSP 12 through the plural transmission lines. In the example of FIG. 1, eight transmission lines are used to transmit pixel data. The transmission lines between the image sensor 11 and the DSP 12 may be any of wire transmission lines and wireless transmission lines. In the following description, a transmission line between the image sensor 11 and the DSP 12 is suitably referred to as lane.

The reception block 31 of the DSP 12 receives pixel data transmitted thereto from the transmission block 22 through the eight lanes and outputs the data of the pixels to the image processing block 32.

The image processing block 32 produces an image of one frame based on pixel data supplied thereto from the reception block 31 and carries out various image processes using the produced image. The image data transmitted from the image sensor 11 to the DSP 12 are raw data, and the image processing block 32 carries out various processes such as compression of image data, display of an image and recording of image data on or into a recording medium.

Figure 2:
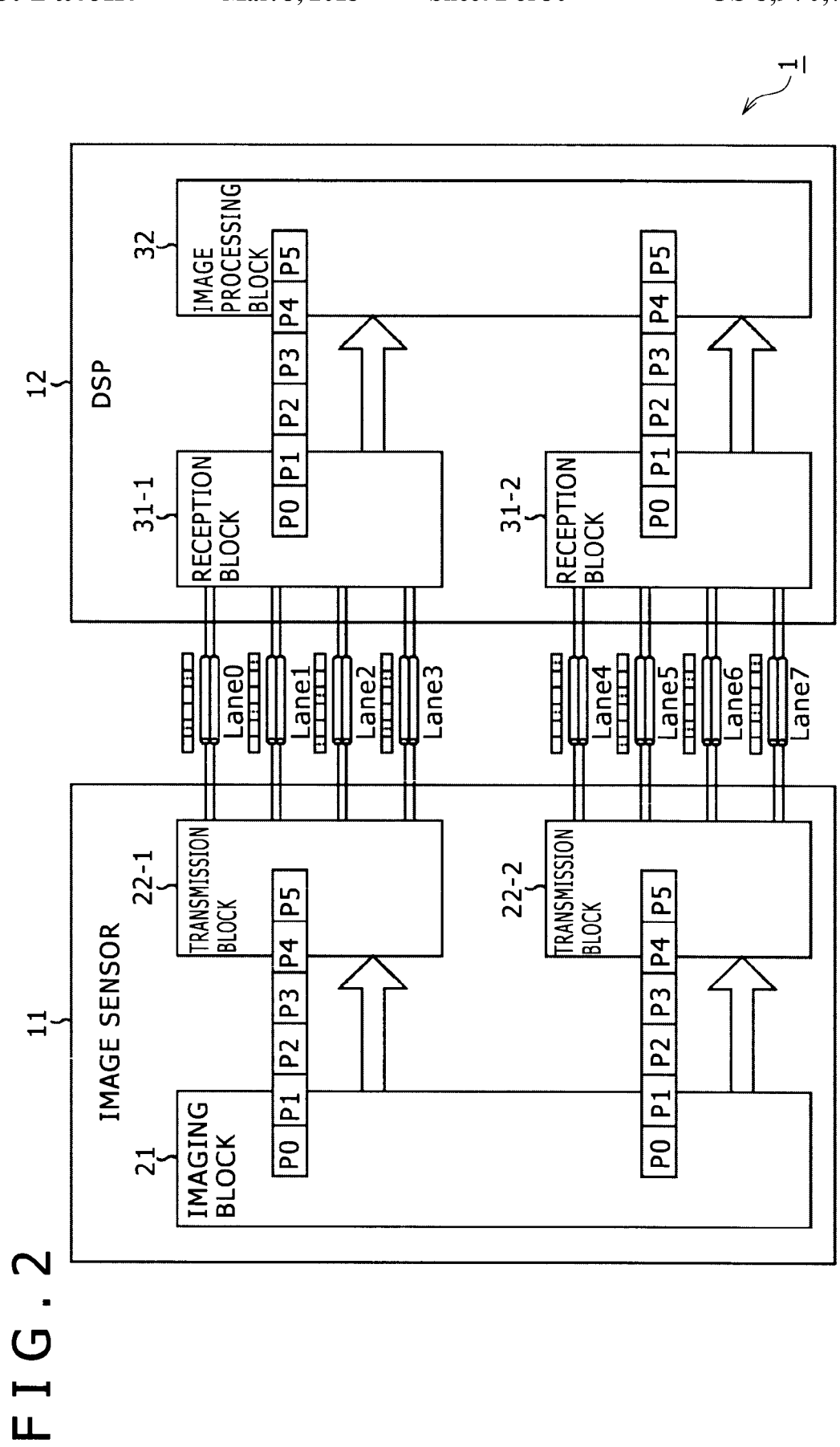

FIG. 2 shows a second example of a configuration of the transmission system 1. The transmission system 1 of FIG. 2 includes several common elements to those of the transmission system 1 of FIG. 1, and overlapping description of such common elements is omitted herein to avoid redundancy.

Referring to FIG. 2, the image sensor 11 of the transmission system 1 includes an imaging block 21 and two transmission sections 22-1 and 22-2, and the DSP 12 includes two reception sections 31-1 and 31-2 and an image processing block 32.

The imaging block 21 outputs pixel data, which configure an image of one frame obtained by carrying out imaging, one by one pixel data in parallel to the transmission sections 22-1 and 22-2. For example, the imaging block 21 outputs data of pixels in an odd-numbered line to the transmission block 22-1 and outputs data of pixels in an even-numbered line to the transmission block 22-2.

The transmission block 22-1 allocates data of pixels supplied thereto from the imaging block 21, for example, in the order in which they are supplied from the imaging block 21, to a plurality of lanes and transmits the data in parallel to the DSP 12 through the plural lanes. Also the transmission block 22-2 similarly allocates data of pixels supplied thereto from the imaging block 21, for example, in the order in which they are supplied from the imaging block 21, to another plurality of lanes and outputs the data in parallel to the DSP 12 through the plural lanes.

Also in the example of FIG. 2, the image sensor 11 and the DSP 12 are connected to each other by eight lanes. Each of the transmission block 22-1 and the transmission block 22 transmits pixel data using four lanes.

The reception block 31-1 of the DSP 12 receives pixel data transmitted thereto from the transmission block 22-1 through the four lanes and outputs the pixel data in order to the image processing block 32. Also the reception block 31-2 similarly receives pixel data transmitted thereto from the transmission block 22-2 through the four lanes and outputs the pixel data in order to the image processing block 32.

The image processing block 32 produces an image of one frame based on pixel data supplied thereto from the reception block 31-1 and pixel data supplied thereto from the reception block 31-2 and carries out various image processes using the produced image.

If two transmission sections are provided in the image sensor 11 and two reception sections are provided correspondingly in the DSP 12 as seen in FIG. 2, then even if the transmission rate of image data outputted from the imaging block 21 is high, pixel data can be transmitted to the DSP 12.

Figure 3:
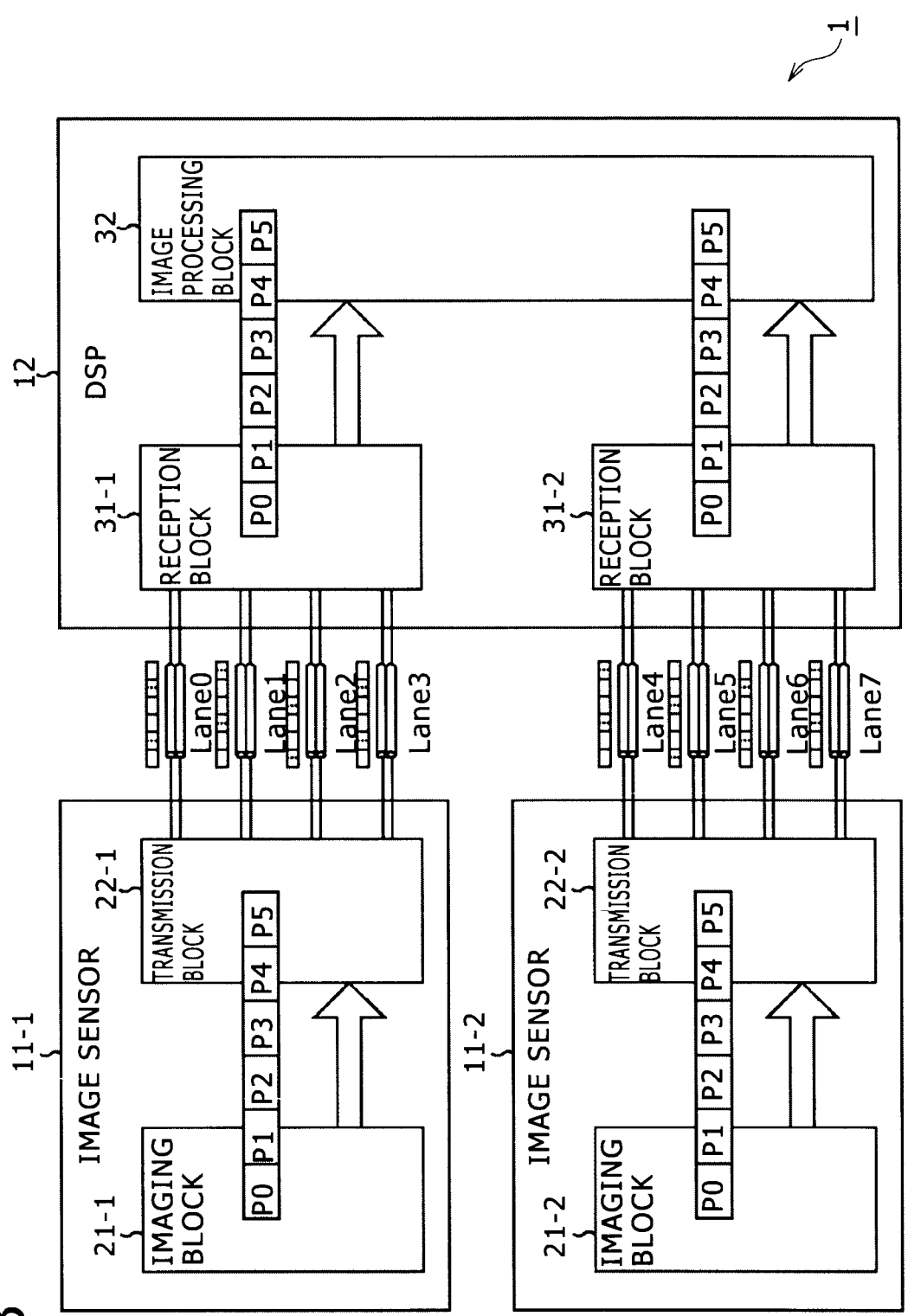

FIG. 3 shows a third example of a configuration of the transmission system 1. Also the transmission system 1 of FIG. 3 includes several common elements to those of the transmission system 1 of FIG. 1, and overlapping description of such common elements is omitted herein to avoid redundancy.

Referring to FIG. 3, the transmission system 1 includes two image sensors 11-1 and 11-2. The image sensor 11-1 includes an imaging block 21-1 and one transmission block 22-1 while the image sensor 11-2 includes an imaging block 21-2 and one transmission block 22-2. Meanwhile, the DSP 12 includes two reception sections 31-1 and 31-2 and an image processing block 32 similarly to the DSP 12 shown in FIG. 2.

The imaging block 21-1 of the image sensor 11-1 outputs pixel data which configure an image of one frame obtained by carrying out imaging in order one by one pixel data to the transmission block 22-1.

The transmission block 22-1 allocates data of pixels supplied thereto from the imaging block 21-1, for example, in the order in which they are supplied from the imaging block 21-1 to a plurality of lanes and transmits the data in parallel to the DSP 12 through the plural lanes.

The imaging block 21-2 of the image sensor 11-2 outputs pixel data which configure an image of one frame obtained by carrying out imaging in order one by one pixel data to the transmission block 22-2.

The transmission block 22-2 allocates data of pixels supplied thereto from the imaging block 21-2, for example, in the order in which they are supplied from the imaging block 21-2 to a plurality of lanes and transmits the data in parallel to the DSP 12 through the plural lanes.

Also in the example of FIG. 3, the image sensor side and the DSP 12 are connected to each other by eight lanes. Four lanes are applied to each of the image sensor 11-1 and the image sensor 11-2, and consequently, each of the transmission block 22-1 and the transmission block 22-2 transmits pixel data using four lanes.

The reception block 31-1 of the DSP 12 receives pixel data transmitted thereto from the transmission block 22-1 of the image sensor 11-1 through the four lanes and outputs the data of the pixels in order to the image processing block 32. Also the reception block 31-2 similarly receives pixel data transmitted thereto from the transmission block 22-2 of the image sensor 11 through the four different lanes and outputs the data of the pixels in order to the image processing block 32.

The image processing block 32 produces an image of one frame based on pixel data supplied thereto from the reception block 31-1 and produces an image of one frame based on pixel data supplied thereto from the reception block 31-2. The image processing block 32 carries out various image processes using the produced images.

By providing two image sensors as seen in FIG. 3, it is possible, for example, to process a 3D image formed from an image for the left eye imaged by the image sensor 11-1 and an image for the right eye imaged by the image sensor 11-2 by means of the single DSP 12. The image for the left eye and the image for the right eye have a parallax.

As described above, the image sensor of the transmission system 1 includes one or a plurality of transmission sections for transmitting picked up image data of one frame. Meanwhile, the DSP includes one or a plurality of reception sections for receiving data transmitted thereto from the image sensor in a corresponding relationship to the transmission section or sections of the image sensor.

In the following, data transmission by the transmission system 1 of FIG. 1 wherein one transmission section is provided in the image sensor 11 and one reception section is provided in the DSP 12 is described. Data transmission is carried out in a similar manner between the transmission block 22-1 and the reception block 31-1 and between the transmission block 22-2 and the reception block 31-2 shown in FIGS. 2 and 3.

<Frame Format>

Figure 4:
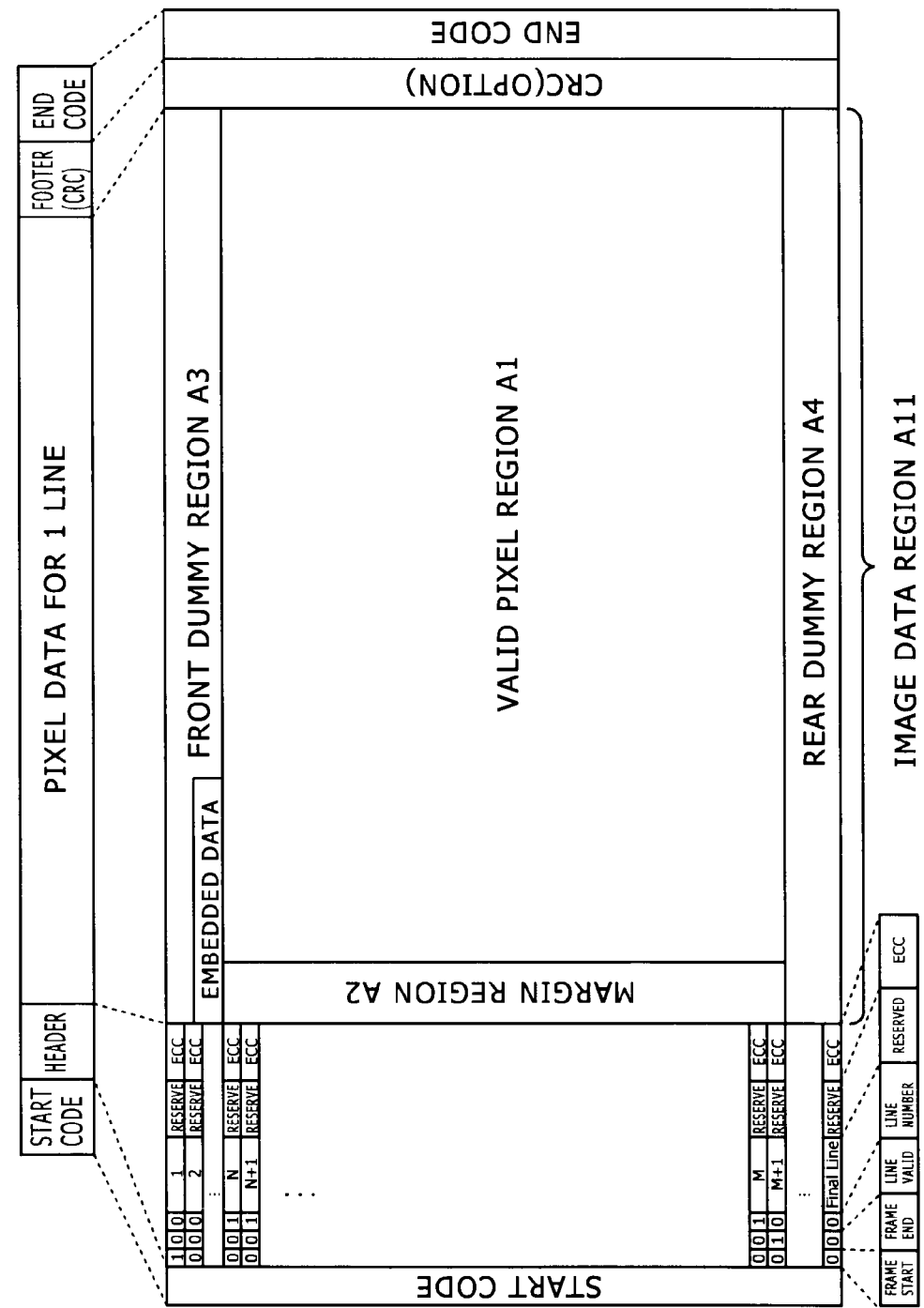
FIG. 4 is a diagrammatic view illustrating an example of a frame format.

FIG. 4 illustrates an example of a format used for transmission of image data of one frame between the image sensor 11 and the DSP 12.

A valid pixel region A1 is a region of valid pixels of an image of one frame imaged by the imaging block 21. On the left side of the valid pixel region A1, a margin region A2 is set wherein the pixel number in the vertical direction is equal to the number of pixels in the vertical direction of the valid pixel region A1.

On the upper side of the valid pixel region A1, a front dummy region A3 is set wherein the number of pixels in the horizontal direction is equal to the number of pixels in the horizontal direction of the entirety of the valid pixel region A1 and the margin region A2. In the example of FIG. 4, Embedded Data is inserted in the front dummy region A3. The Embedded Data includes information of set values relating to imaging by the imaging block 21 such as a shutter speed, an iris value and a gain. The Embedded Data is sometimes inserted in a rear dummy region A4.

On the lower side of the valid pixel region A1, the rear dummy region A4 is set wherein the number of pixels in the horizontal direction is equal to the number of pixels in the horizontal direction of the entirety of the valid pixel region A1 and the margin region A2.

An image data region A11 is configured from the valid pixel region A1, margin region A2, front dummy region A3 and rear dummy region A4.

A header is added to the front of each of lines which configure the image data region A11, and Start Code is added to the front of the header. Further, a footer is added optionally to the rear of each of the lines which configure the image data region A11, and a controlling code hereinafter described such as End Code is added to the rear of the footer. If the footer is not added, then a controlling code such as End Code is added to the rear of each of the lines which configure the image data region A11.

Every time an image of one frame imaged by the imaging block 21 is transmitted from the image sensor 11 to the DSP 12, the entire data of the format illustrated in FIG. 4 are transmitted as transmission data.

An upper side zone in FIG. 4 illustrates a structure of a packet used for transmission of transmission data illustrated below. Where a sequence of pixels in the horizontal direction is represented as line, data of pixels which configure one line of the image data region A11 are placed in the payload of the packet. Transmission of the entire pixel data of one frame is carried out using a number of pixels not smaller than the number of pixels of the image data region A11 in the vertical direction.

One packet is configured by adding a header and a footer to the payload in which pixel data for one line are placed. As hereinafter described in detail, the header includes additional information to the pixel data placed in the payload such as Frame Start, Frame End, Line Valid, Line Number and ECC. To each packet, at least Start Code and End Code which are controlling codes are added.

In this manner, by adopting the format for transmitting pixel data, which configure an image of one frame, for each line, it is possible to transmit additional information such as the header and controlling codes such as Start Code and End Code within a blanking period for each line.

<Configuration of the Transmission Block 22 and the Reception Block 31>

Figure 5:
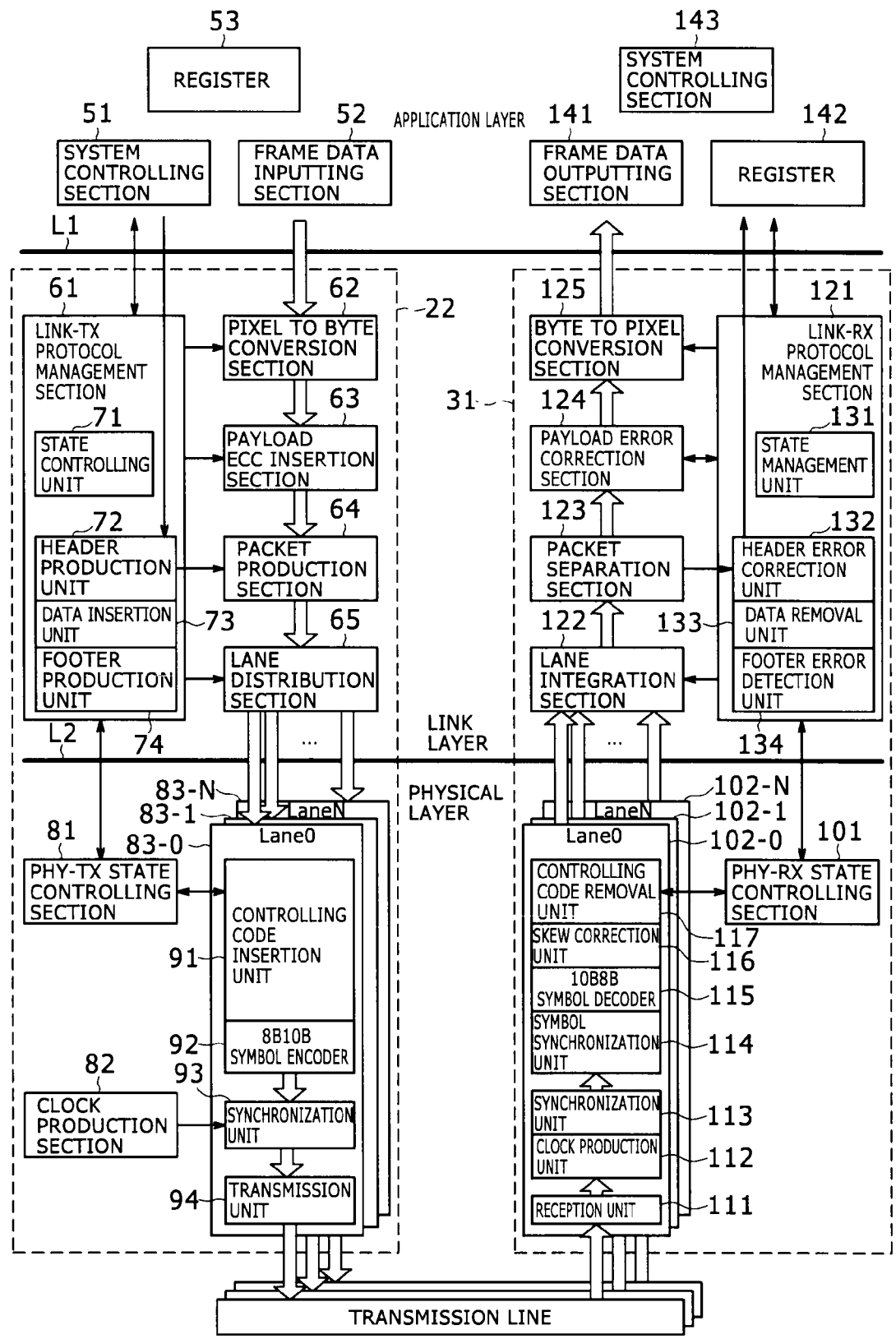
FIG. 5 is a block diagram showing an example of a configuration of a transmission section and a reception section.

FIG. 5 shows an example of a configuration of the transmission block 22 and the reception block 31.

A configuration shown surrounded by a broken line on the left side in FIG. 5 is a configuration of the transmission block 22, and a configuration shown surrounded by a broken line on the right side in 5 is a configuration of the reception block 31. Each of the transmission block 22 and the reception block 31 includes a configuration of a link layer and a configuration of a physical layer. A configuration shown on the upper side with respect to a solid line L2 is a configuration of the link layer, and a configuration shown on the lower side with respect to the solid line L2 is a configuration of the physical layer.

It is to be noted that a configuration shown above a solid line L1 is a configuration of an application layer. A system controlling section 51, a frame data inputting section 52 and a register 53 are implemented in the imaging block 21. The system controlling section 51 communicates with a LINK-TX protocol management section 61 of the transmission block 22 and controls transmission of image data by providing information relating to a frame format and so forth. The frame data inputting section 52 carries out imaging in response to an instruction of a user or the like and supplies data of pixels which configure an image obtained by the imaging to a Pixel to Byte conversion section 62 of the transmission block 22. The register 53 stores information of a bit number of Pixel to Byte conversion, a Lane number and so forth. A transmission process of image data is carried out in accordance with the information stored in the register 53.

Meanwhile, from within the configuration of the application layer, a frame data outputting section 141, a register 142 and a system controlling section 143 are implemented by the image processing block 32. The frame data outputting section 141 produces an image of one frame based on pixel data of lines supplied thereto from the reception block 31 and outputs the produced image. Various processes are carried out using the image outputted from the frame data outputting section 141. The register 142 stores various set values relating to reception of image data such as the bit number of Byte to Pixel conversion and the Lane number. A reception process of image data is carried out in accordance with the information stored in the register 142. The system controlling section 143 communicates with a LINK-RX protocol management section 121 to control a sequence of mode change and so forth.

[Configuration of the Link Layer of the Transmission Block 22]

First, the configuration of the link layer of the transmission block 22 is described.

The transmission block 22 includes, as a configuration of the link layer, the LINK-TX protocol management section 61, the Pixel to Byte conversion section 62, a payload ECC insertion section 63, a packet production section 64 and a lane distribution section 65. The LINK-TX protocol management section 61 includes a state controlling unit 71, a header production unit 72, a data insertion unit 73 and a footer production unit 74.

The state controlling unit 71 of the LINK-TX protocol management section 61 manages the state of the link layer of the transmission block 22.

The header production unit 72 produces a header to be added to the payload in which image data for one line are placed and outputs the header to the packet production section 64.

Figure 6:
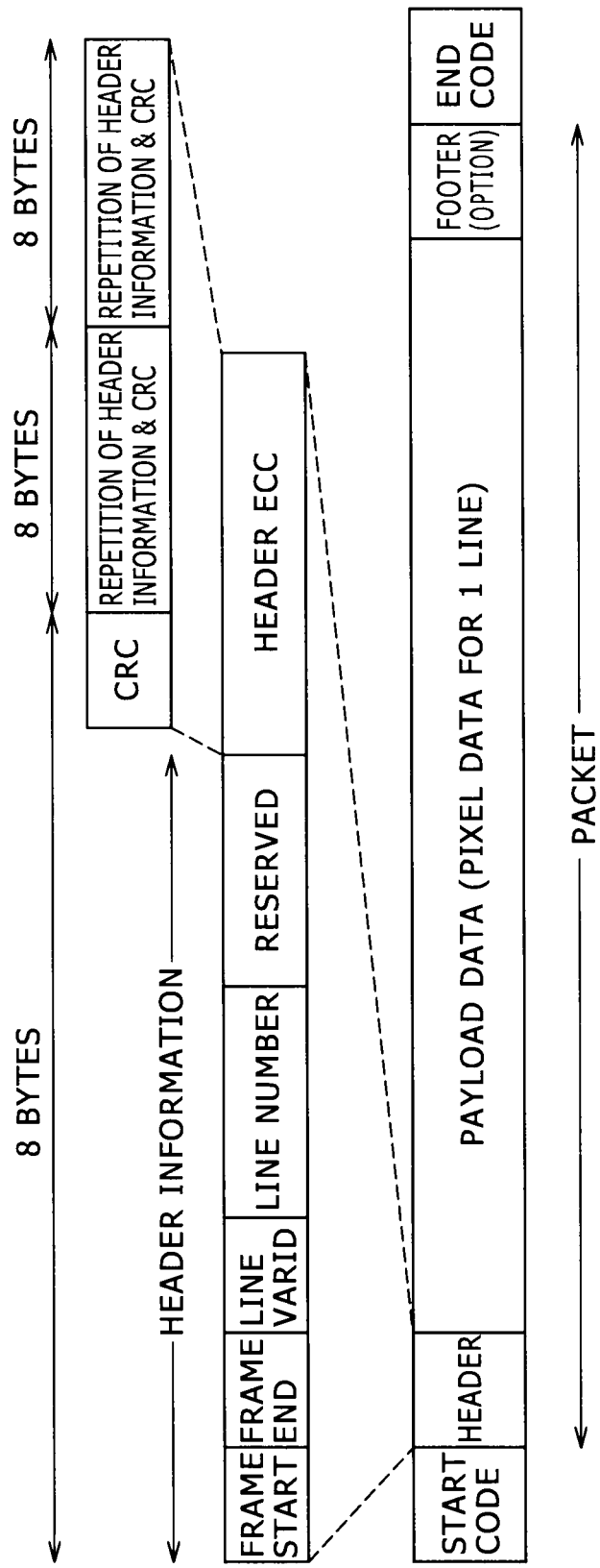
FIG. 6 is a diagrammatic view illustrating a header structure.

FIG. 6 shows a structure of a header produced by the header production unit 72.

As described above, one packet is configured from a header and payload data which are image data for one line. A footer is sometimes added to a packet. The header is configured from header information and Header ECC.

The header information includes Frame Start, Frame End, Line Valid, Line Number and Reserved. The substance and the information amount of the kinds of information are illustrated in FIG. 7.

Frame Start is information of one bit representative of the front of a frame. To Frame Start of the header of a packet used for transmission of image data of the first line of the image data region A11 of FIG. 4, the value of 1 is set, and to Frame Start of the header of a packet used for transmission of pixel data of any other line, the value of 0 is set.

Frame End is information of 1 bit indicative of the rear of a frame. To Frame End of the header of the packet wherein pixel data of the last line of the valid pixel region A1 are included in the payload, the value of 1 is set, and to Frame End of the header of a packet used for transmission of pixel data of any other line, the value of 0 is set.

Frame Start and Frame End are frame information which is information relating to a frame.

Line Valid is information of 1 bit representative of whether or not the line of pixel data placed in the payload is a line of valid pixels. To Line Valid of the header of a packet used for transmission of pixel data in the lines in the valid pixel region A1, the value of 1 is set, and to Line Valid of the header of a packet used for transmission of pixel data in any other line, the value of 0 is set.

Line Number is information of 13 bits representative of a line number of a line configured from pixel data placed in the payload.

Line Valid and Line Number are line information which is information relating to a line.

Reserved is a region of 32 bits for extension. The data amount of the entire header information is 6 bytes.

As seen in FIG. 6, Header ECC disposed next to the header information includes a CRC (Cyclic Redundancy Check) code which is an error detection code of 2 bytes calculated based on the header information of 6 bytes. Header ECC further includes, next to the CRC code, two pieces of information of 8 bytes which is a set of the header information and the CRC code.

In particular, the header of one packet includes three sets of the same header information and CRC code. The data amount of the entire header is totaling 24 bytes including 8 bytes of the first set of the header information and CRC code, 8 bytes of the second set of the heard information and CRC code and 8 bytes of the third set of header information and CRC code.

FIG. 8 illustrates an example of a bit array of 8 bytes which configure one set of header information and a CRC code.

Referring to FIG. 8, a byte H7 which is the first byte of eight bytes which configure a header includes one bit of each of Frame Start, Frame End and Line Valid and first to fifth bits of 13 bits of Line Number in order from the first bit. Further, a byte H6 which is the second one byte includes the sixth to thirteenth bits from among the 13 bits of Line Number.

Bytes from a byte H5 which is the third one byte to a byte H2 which is the sixth one byte make Reserved. A byte H1 which is the seventh one bit and a byte H0 which is the eighth one byte include bits of a CRC code.

Referring back to FIG. 5, the header production unit 72 produces header information under the control of the system controlling section 51. For example, the system controlling section 51 supplies information representative of a line number of pixel data to be outputted from the frame data inputting section 52 and information representative of the front and the rear of a frame.

Further, the header production unit 72 applies header information to a generating polynomial to calculate a CRC code. The generating polynomial of a CRC code to be added to header information is represented, for example, by the following expression (1):

$$CRC16 = X^{16} + X^{15} + X^2 + 1 \qquad (1)$$

The header production unit 72 adds a CRC code to header information to produce a set of the header information and the CRC code and disposes the same set of the header information and the CRC code repetitively by three sets to produce a header. The header production unit 72 outputs the produced header to the packet production section 64.

The data insertion unit 73 produces data to be used for stuffing and outputs the data to the Pixel to Byte conversion section 62 and the lane distribution section 65. Payload stuffing data which are stuffing data supplied to the Pixel to Byte conversion section 62 are added to pixel data after Pixel to Byte conversion and are used for adjustment of the data amount of the pixel data to be placed into the payload. Meanwhile, lane stuffing data which are the stuffing data supplied to the lane distribution section 65 are added to data after lane allocation and used for adjustment of the data amount among the lanes.

The footer production unit 74 suitably applies payload data to a generating polynomial under the control of the system controlling section 51 to calculate a CRC code of 32 bits and outputs the CRC code determined by calculation as a footer to the packet production section 64. The generating polynomial of a CRC code to be added as a footer is represented, for example, by the following expression (2):

$$CRC32 = X^{32} + X^{31} + X^4 + X^3 + X + 1 \qquad (2)$$

The Pixel to Byte conversion section 62 acquires pixel data supplied thereto from the frame data inputting section 52 and carries out Pixel to Byte conversion of converting data of each pixel into data of a unit of 1 byte. For example, the pixel value (RGB) of each pixel of an image picked up by the imaging block 21 is represented by a bit number which is one of 8 bits, 10 bits, 12 bits, 14 bits and 16 bits.

Figure 9:
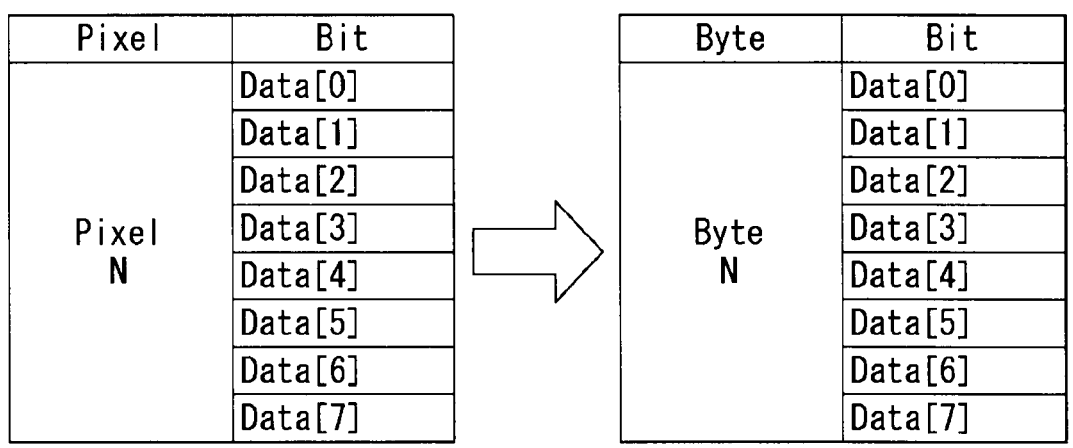
FIG. 9 is a view illustrating Pixel to Byte conversion in the case where the pixel value of each pixel is represented by 8 bits.

FIG. 9 illustrates an example of Pixel to Byte conversion in the case where the pixel value of each pixel is represented by 8 bits.

Referring to FIG. 9, Data[0] represents the LSB (least significant bit), and Data[7] having the highest digit represents the MSB (most significant bit). As indicated by a solid-white arrow mark, the eight bits of Data[0] to Data[7] representative of a pixel value of a pixel N is converted into Byte N formed from Data[0] to Data[7]. In the case where the pixel value of each pixel is represented by 8 bits, the number of data of byte units after the Pixel to Byte conversion is equal to the number of pixels.

Figure 10:
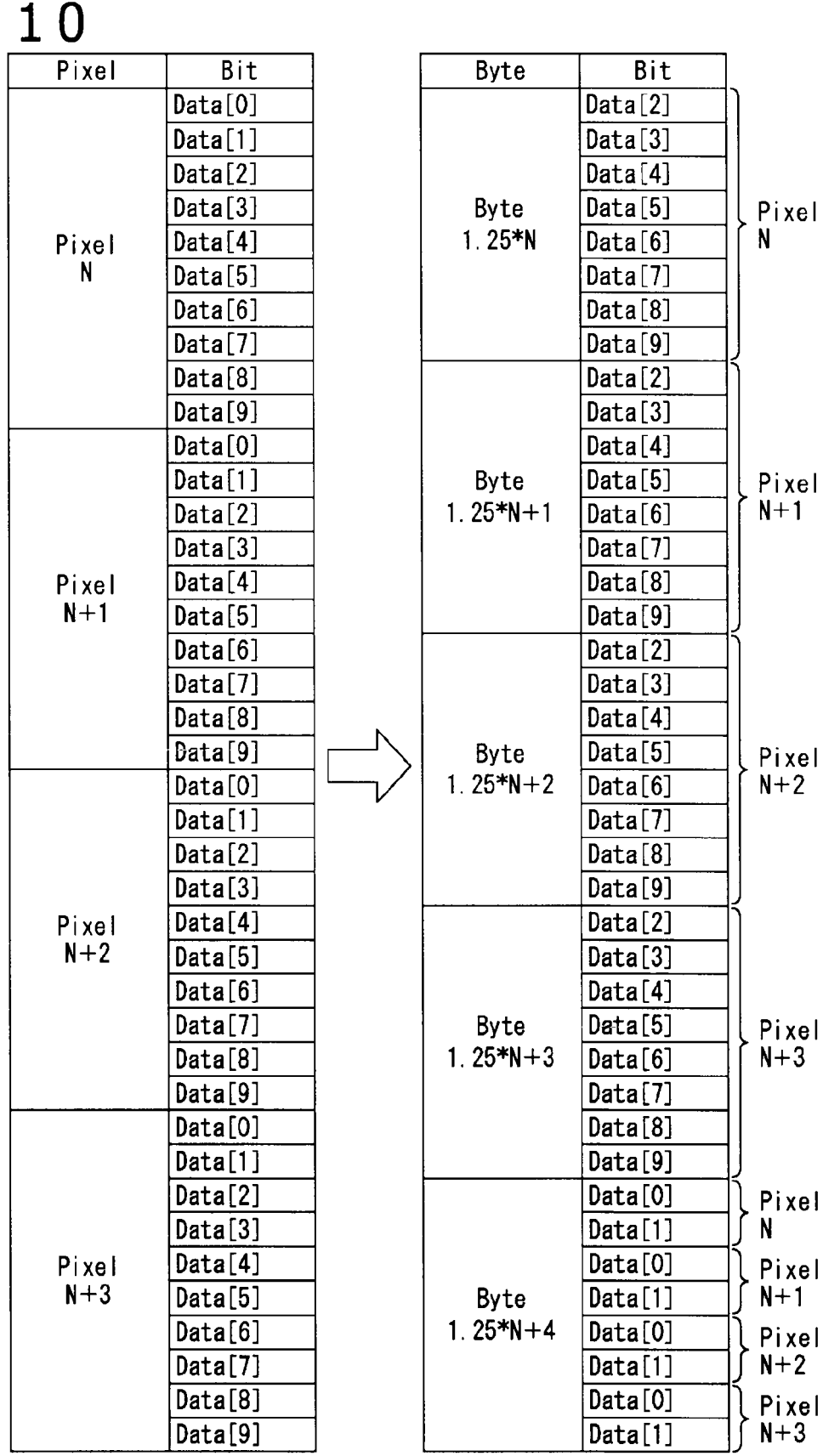
FIG. 10 is a view illustrating Pixel to Byte conversion in the case where the pixel value of each pixel is represented by 10 bits.

FIG. 10 illustrates an example of Pixel to Byte conversion in the case where the pixel value of each pixel is represented by 10 bits.

In this instance, 10 bits of Data[0] to Data[9] representative of a pixel value of a pixel N are converted into Byte 1.25*N including Data[2] to Data[9].

Also with regard to pixels N+1 to N+3, 10 bits of Data[0] to Data[9] representative of pixel values of the same are converted into Byte 1.25*N+1 to Byte 1.25*N+3 including Data[2] to Data[9], respectively. Further, Data[0] and Data[1] which are lower order bits of the pixels N to N+3 are collected and converted into Byte 1.25*N+4. In the case where the pixel value of each pixel is represented by 10 bits, the number of data in a unit of a byte after the Pixel to Byte conversion is 1.25 times the number of pixels.

Figure 11:
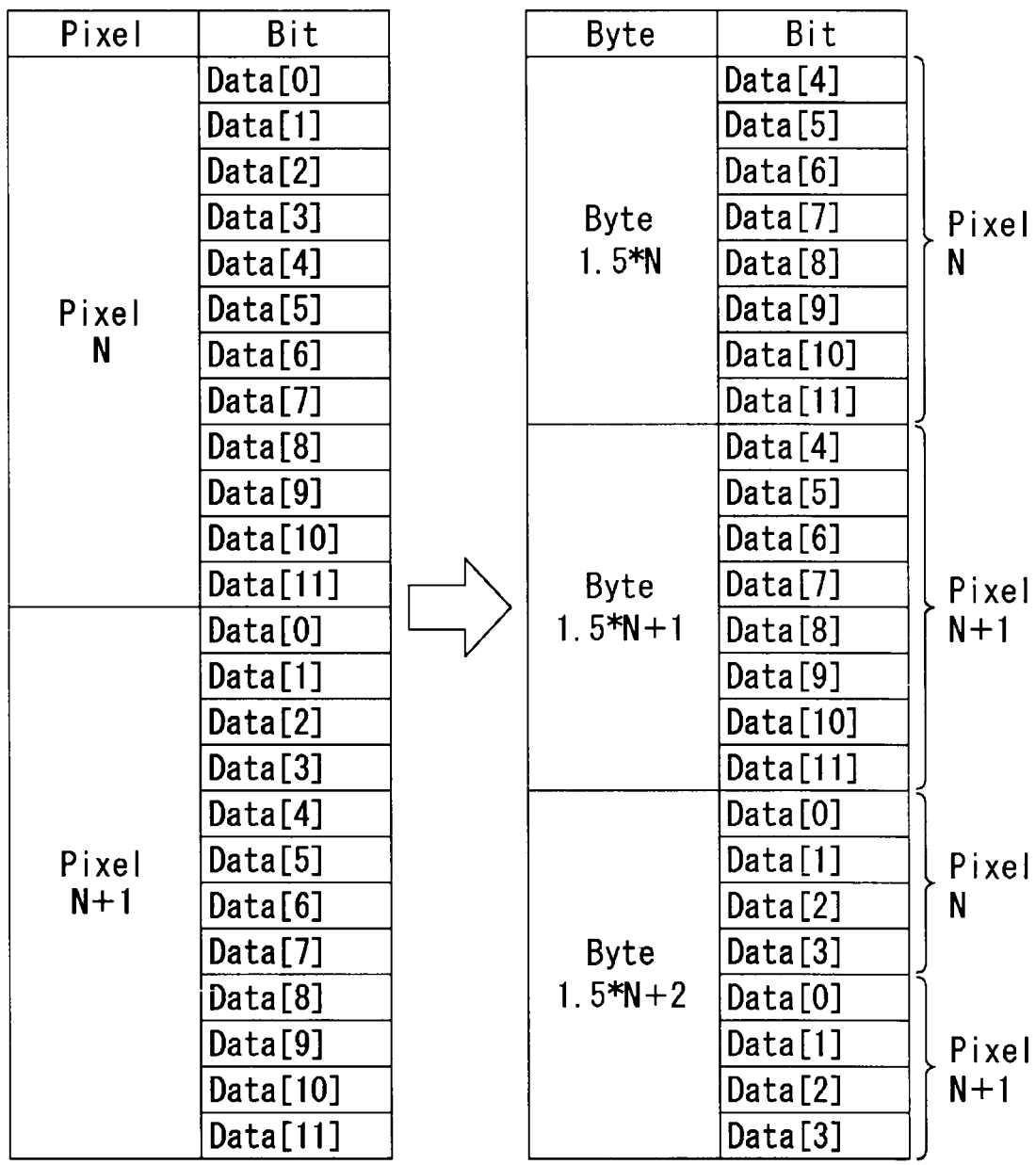
FIG. 11 is a view illustrating Pixel to Byte conversion in the case where the pixel value of each pixel is represented by 12 bits.

FIG. 11 illustrates an example of the Pixel to Byte conversion in the case where the pixel value of each pixel is represented by 12 bits.

In this instance, 12 bits of Data[0] to Data[11] representative of the pixel value of the pixel N are converted into Byte 1.5*N formed from Data[4] to Data[11].

Also with regard to the pixel N+1, 12 bits of Data[0] to Data[11] representative of a pixel value of the pixel N+1 are converted into Byte 1.5*N+1 formed from Data[4] to Data [11]. Further, Data[0] to Data[3] which are the lower order bits of the pixel N and the pixel N+1 are collected and converted into Byte 1.5*N+2. In the case where the pixel value of each pixel is represented by 12 bits, the number of data of a unit of a byte after the Pixel to Byte conversion is 1.5 times the number of pixels.

Figure 12:
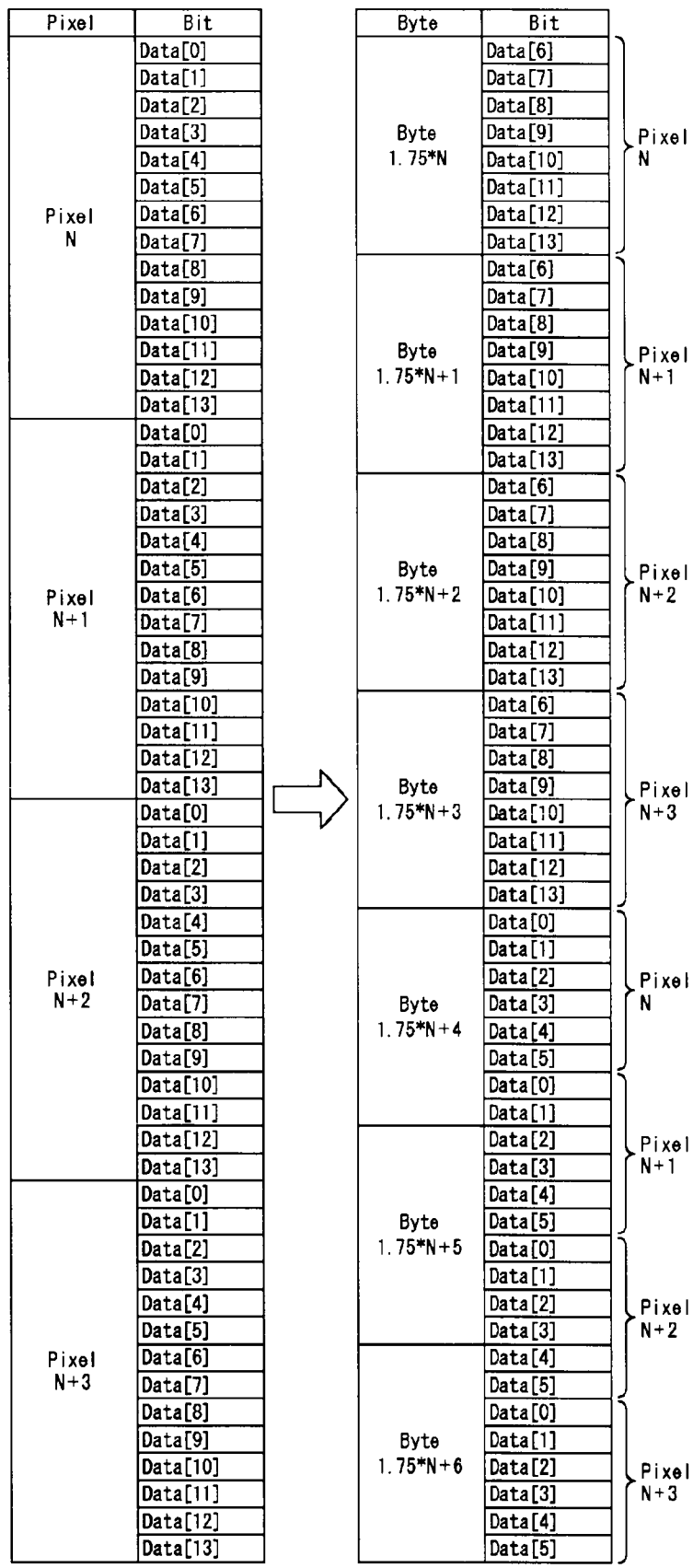
FIG. 12 is a view illustrating Pixel to Byte conversion in the case where the pixel value of each pixel is represented by 14 bits.

FIG. 12 illustrates an example of the Pixel to Byte conversion in the case where the pixel value of each pixel is represented by 14 bits.

In this instance, 14 bits of Data[0] to Data[13] representative of a pixel value of the pixel N are converted into Byte 1.75*N including Data[6] to Data[13].

Also with regard to pixels N+1 to N+3, 14 bits of Data[0] to Data[13] representative of pixel values of the same are converted into Byte 1.75*N+1 to Byte 1.75*N+3 including Data[6] to Data[13], respectively. Further, the remaining bits from among the pixels of the pixels N to N+3 are collected in order and converted into Byte 1.75*N+4. For example, Data [0] to Data[5] which are bits of the pixel N and Data[0] and Data[1] which are bits of the pixel N+1 are converted into Byte 1.75*N+4.

Similarly, Data[2] to Data[5] which are bits of the pixel N+1 and Data[0] to Data[3] which are bits of the pixel N+2 are converted into Byte 1.75*N+5, and Data[4] and Data[5]

which are bits of the pixel N+2 and Data[0] to Data[5] which are bits of the pixel N+3 are converted into Byte 1.75*N+6. In the case where the pixel value of each pixel is represented by 14 bits, the number of data of a unit of a byte after the Pixel to Byte conversion is 1.75 times the number of pixels.

Figure 13:
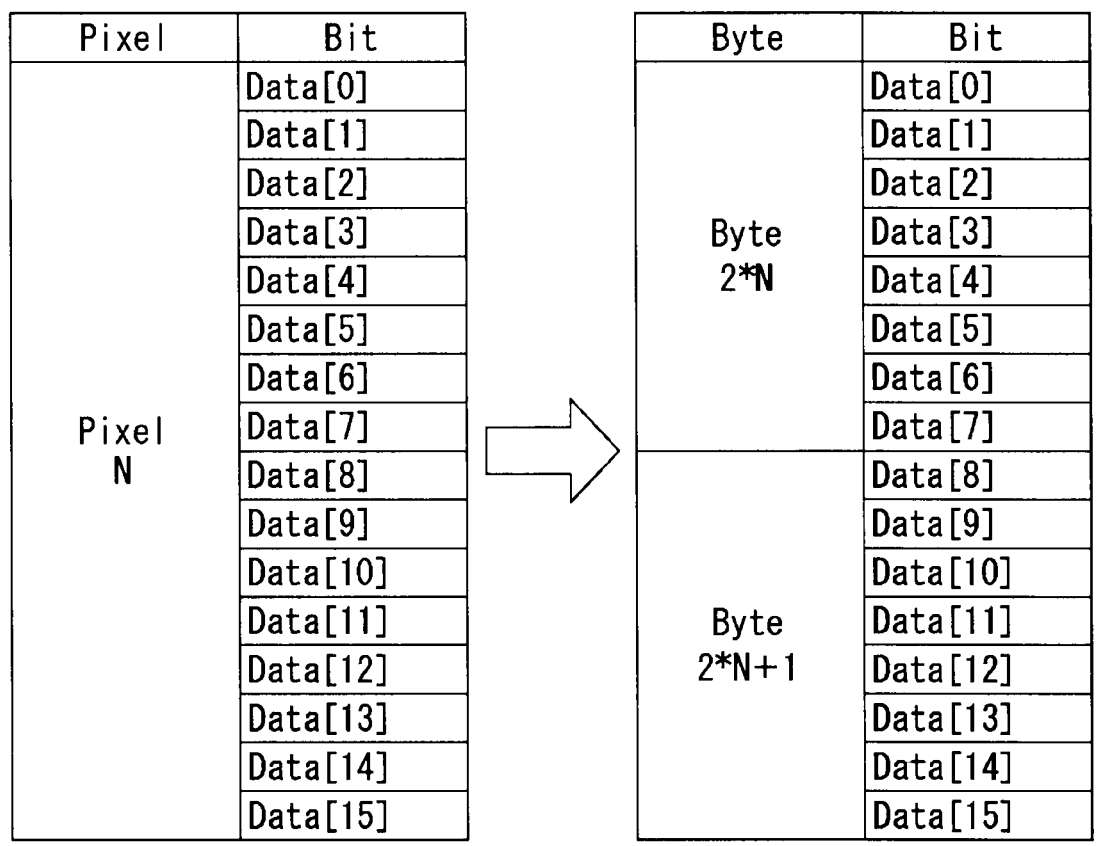
FIG. 13 is a view illustrating Pixel to Byte conversion in the case where the pixel value of each pixel is represented by 16 bits.

FIG. 13 illustrates an example of the Pixel to Byte conversion in the case where the pixel value of each pixel is represented by 16 bits.

In this instance, 16 bits of Data[0] to Data[15] representative of the pixel value of the pixel N are converted into Byte 2*B formed from Data [0] to Data [7] and Byte 2*N+1 formed from Data[8] to Data[15]. In the case where the pixel value of each pixel is represented by 16 bits, the number of data of a unit of a byte after the Pixel to Byte conversion is two times the number of pixels.

The Pixel to Byte conversion section 62 shown in FIG. 5 carries out such Pixel to Byte conversion as described above for each pixel in order beginning, for example, with the pixel at the left end of a line. Further, the Pixel to Byte conversion section 62 adds payload stuffing data supplied thereto from the data insertion unit 73 to the pixel data of a unit of a byte obtained by the Pixel to Byte conversion to produce payload data and outputs the payload data to the payload ECC insertion section 63.

Figure 14:
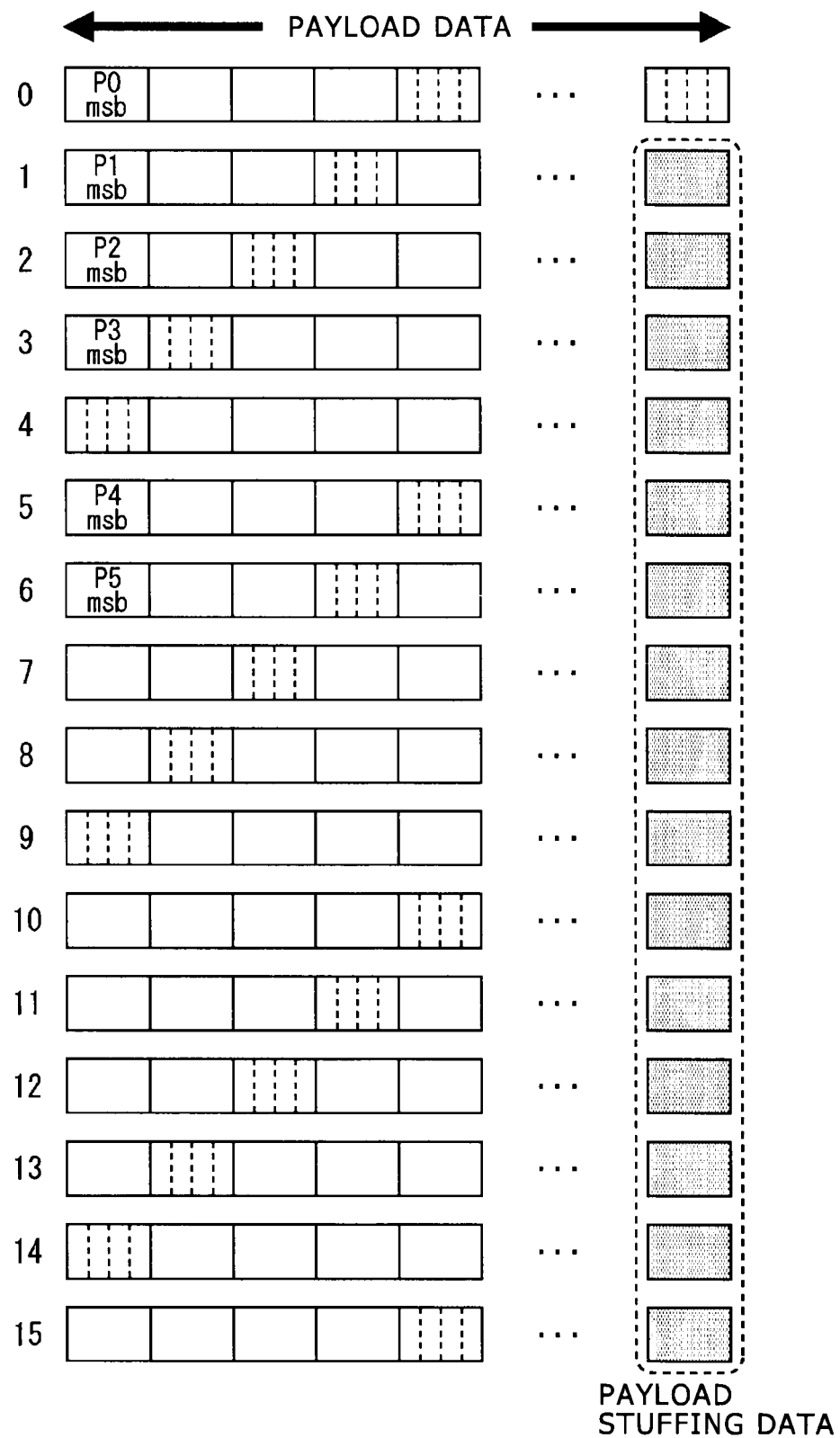
FIGS. 14 and 15 are diagrammatic views illustrating different examples of payload data.

FIG. 14 illustrates an example of payload data.

FIG. 14 illustrates payload data including pixel data obtained by the Pixel to Byte conversion in the case where the pixel value of each pixel is represented by 10 bits. One block to which no color is applied represents pixel data of a unit of a byte after Pixel to Byte conversion. Meanwhile, one block to which a color is applied represents payload stuffing data formed by the data insertion unit 73.

The pixel data after the Pixel to Byte conversion are grouped in the order obtained by the conversion into a predetermined number of groups. In the example of FIG. 14, the pixel data are grouped into 16 groups of group 1 to group 15, and pixel data including the MSB of a pixel P0 is allocated to the group 0, and pixel data including the MSB of a pixel P1 is allocated to the group 1. Further, pixel data including the MSB of a pixel P2 is allocated to the group 2, and pixel data including the MSB of a pixel P3 is allocated to the group 3 while pixel data including the LSB of the pixels P0 to P3 is allocated to the group 4.

Also pixel data succeeding the pixel data of the MSB of a pixel P4 are allocated in order to individual succeeding groups beginning with the group 5. When a certain pixel data is allocated to the group 15, the succeeding pixel data are allocated in order to groups beginning with the group 0. It is to be noted that, from among the blocks representative of pixel data, those blocks to the inside of which three broken lines are applied represent pixel data in a unit of a byte produced upon Pixel to Byte Conversion such that they include the LSB of the pixels N to N+3.

In the link layer of the transmission block 22, grouping is carried out in such a manner as described above, and thereafter, for each period defined by a clock signal, the process is carried out in parallel for pixel data which are positioned at the same position in the groups. In particular, in the case where pixel data are allocated to 16 groups as seen in FIG. 14, the process of pixel data is carried out such that 16 pixel data juxtaposed in each column are processed within the same period.

As described hereinabove, the payload of one packet includes pixel data for one line. The entire pixel data illustrated in FIG. 14 are pixel data which configure one line. While description is given of processing of pixel data in the valid pixel region A1 of FIG. 4, also pixel data in the other regions such as the margin region A2 are processed together with the pixel data of the valid pixel region A1.

After pixel data for one line are grouped, payload stuffing data is added such that the groups have an equal data length. The payload stuffing data is one-byte data.

In the example of FIG. 14, the stuffing data is not added to the pixel data of the group 0, but is added one by one to the pixel data of the groups 1 to 15 as indicated by a broken line framework. The data length (Byte) of payload data formed from pixel data and stuffing data is represented by the following expression (3):

$$PayloadLength = LineLength \times \frac{BitPix}{8} + PayloadStuffing \quad (3)$$

where LineLength represents the pixel number of a line, and BitPix represents a bit number representative of a pixel value of one pixel while PayloadStuffing represents the number of payload stuffing data.

In the case where pixel data are to be allocated to 16 groups as seen in FIG. 14, the number of payload stuffing data is represented by the following expression (4), in which % represents the remainder:

$$PayloadStuffing = 16 - \left(\left(LineLength \times \frac{BitPix}{8}\right) \% \ 16\right) \quad (4)$$

Figure 15:
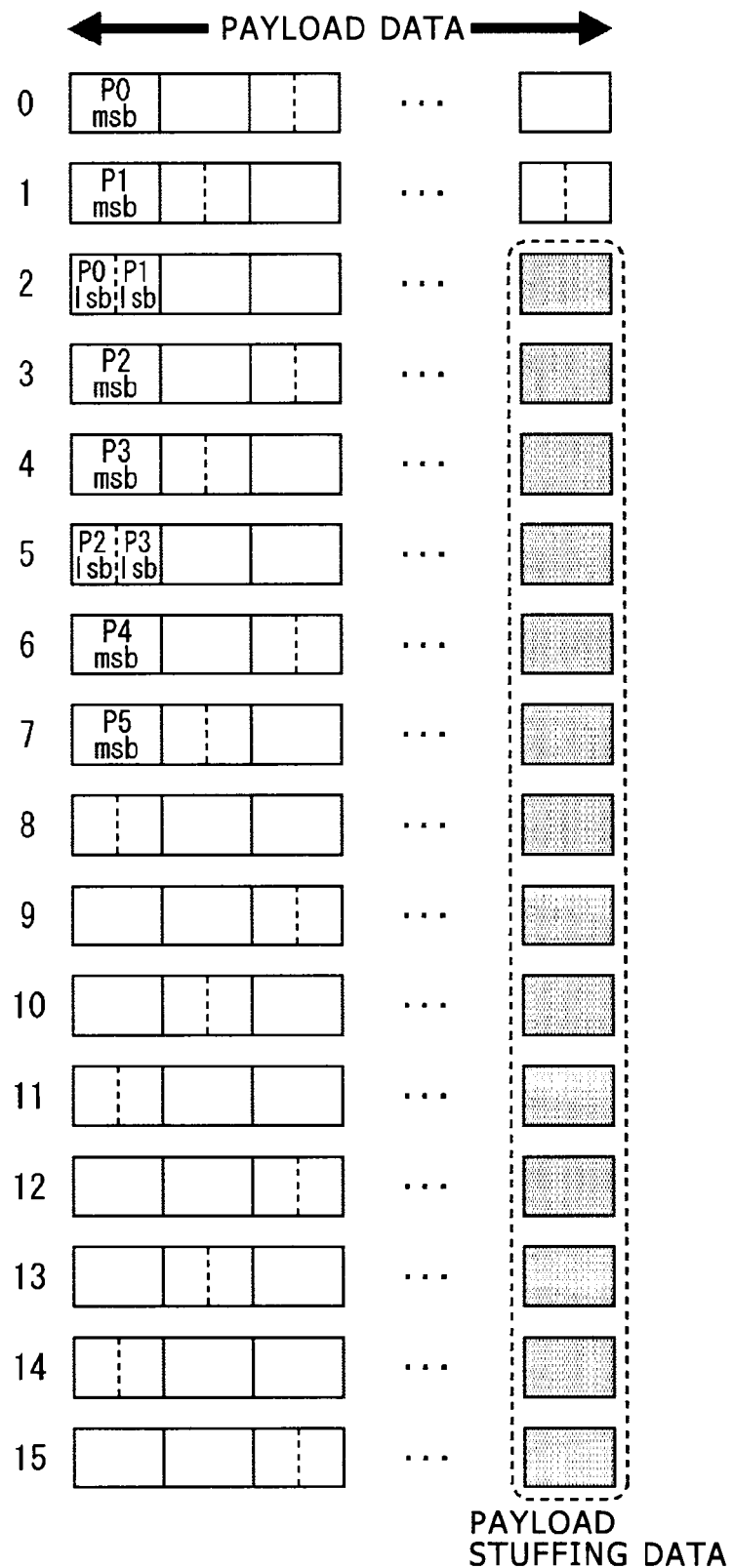

FIG. 15 illustrates another example of the payload data.

More particularly, FIG. 15 illustrates payload including pixel data obtained by Pixel to Byte conversion in the case where the pixel value of each pixel is represented by 12 bits.

In the example of FIG. 15, pixel data including the MSB of the pixel P0 are allocated to the group 0 and pixel data including the MSB of the pixel P1 are allocated to the group 1 while pixel data including the LSM of the pixel P0 and the pixel P1 are allocated to the group 2. Also succeeding pixel data to the pixel data including the MSB of the pixel P2 are allocated in order to successive groups beginning with the group 3. Further, from among the blocks representative of pixel data, those blocks having one broken line applied in the inside thereof represent pixel data in a unit of a byte produced upon Pixel to Byte conversion such that they include the LSB of the pixel N and the pixel N+1.

In the example of FIG. 15, the payload stuffing data is not added to the pixel data of the group 0 and the group 1, and the payload stuffing data is applied one by one to the terminal end of the pixel data of the groups 2 to 15.

Payload data having such a configuration as described above are supplied from the Pixel to Byte conversion section 62 to the payload ECC insertion section 63.

The payload ECC insertion section 63 calculates an error correction code to be used for error correction of payload data based on payload data supplied thereto from the Pixel to Byte conversion section 62 and inserts a parity which is the error correction code determined by the calculation into the payload data. As the error correction code, for example, a Reed-Solomon code is used. Further, the insertion of an error correction code is optional, and for example, only one of insertion of a parity by the payload ECC insertion section 63 and addition of a footer by the footer production unit 74 is permitted.

Figure 16:
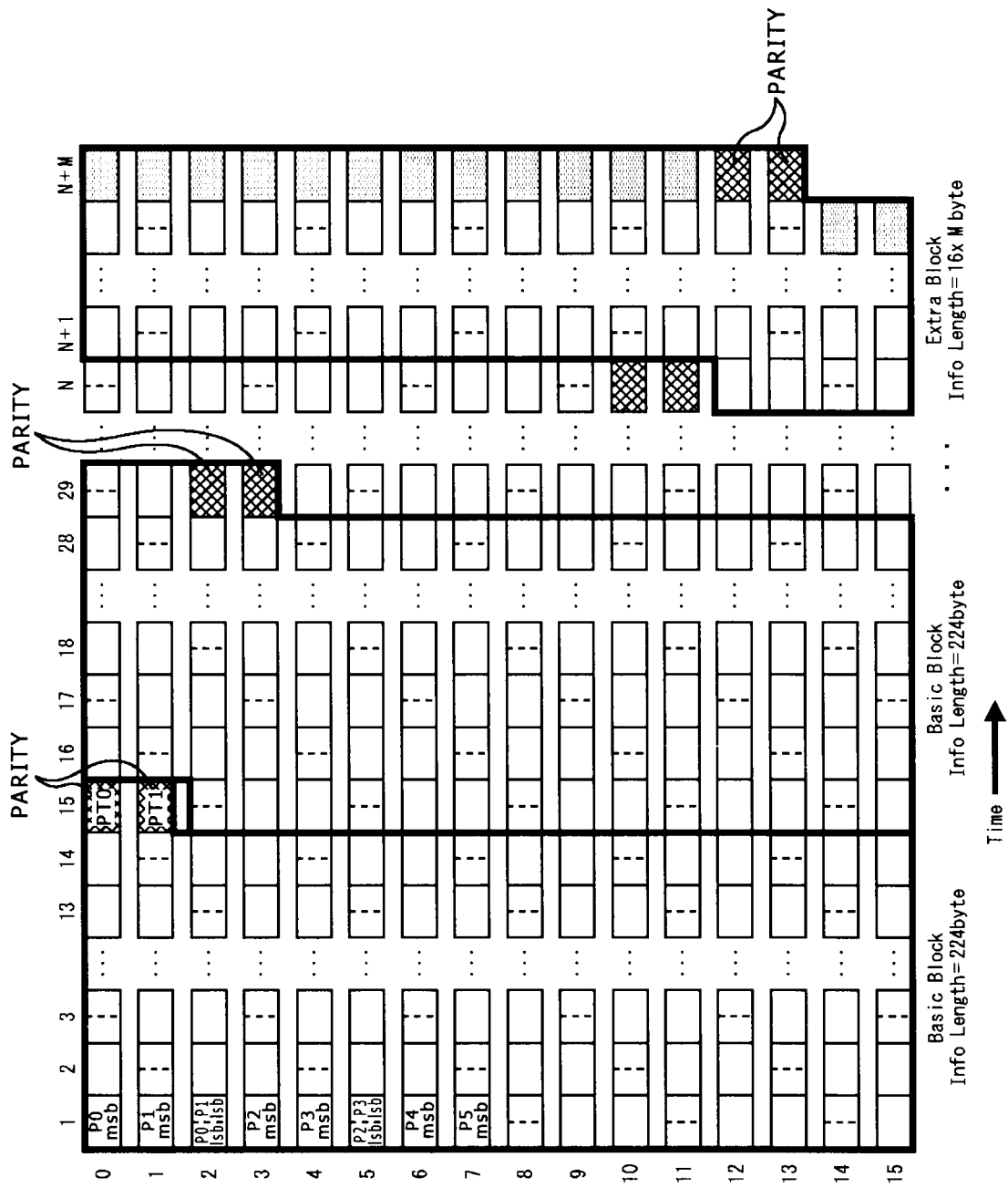
FIG. 16 is a diagrammatic view illustrating an example of payload data in which a parity is inserted.

FIG. 16 illustrates an example of payload data into which a parity is inserted.

The payload data illustrated in FIG. 16 are payload data including pixel data obtained by Pixel to Byte conversion in the case where the pixel value of each pixel is represented by 12 bits as described hereinabove with reference to FIG. 15. A block indicated by lattice pattern represents a parity.

In the example of FIG. 16, 14 pixel data are successively selected from each of the groups 0 to 15 beginning with the front pixel data of the group, and a parity of 2 bytes is determined based on totaling 224 pixel data of 224 bytes selected in this manner. The parity of 2 bytes is inserted as the fifteenth data of the groups 0 and 1 next to the 224 pixel data used for the calculation. Thus, first Basic Block is formed from 224 pixel data and a parity of 2 bytes.

In this manner, the Pixel to Byte conversion section 62 basically produces a parity of 2 bytes based on 224 pixel data and inserts the parity of 2 bytes next to the 224 pixel data.

Further, in the example of FIG. 16, 224 pixel data following the first Basic Block are successively selected from within the groups, and a parity of 2 bytes is determined based on the selected 224 pixel data. The parity of 2 bytes is inserted as the 29th data of the groups 2 and 3 next to the 224 pixel data used for the calculation, and a second Basic Block is formed from the 224 pixel data and the parity of 2 bytes.

In the case where 16×M which is a number of pixel data and payload stuffing data following a certain Basic Block does not reach 224, a parity of 2 bytes is determined based on the remaining 16×M blocks, that is, 16×M pixel data and payload stuffing data. Further, the determined parity of 2 bytes is inserted next to the payload stuffing data, and an Extra Block is formed from the 16×M blocks and the parities of 2 bytes.

The payload ECC insertion section 63 outputs the payload data having the parities inserted therein to the packet production section 64. If insertion of a parity is not carried out, then payload data supplied from the Pixel to Byte conversion section 62 to the payload ECC insertion section 63 are outputted as they are to the packet production section 64.

The packet production section 64 adds a header produced by the header production unit 72 to the payload data supplied thereto from the payload ECC insertion section 63 to produce a packet. In the case where production of a footer is carried out by the footer production unit 74, the packet production section 64 carries out also addition of a footer to the payload data.

Figure 17:
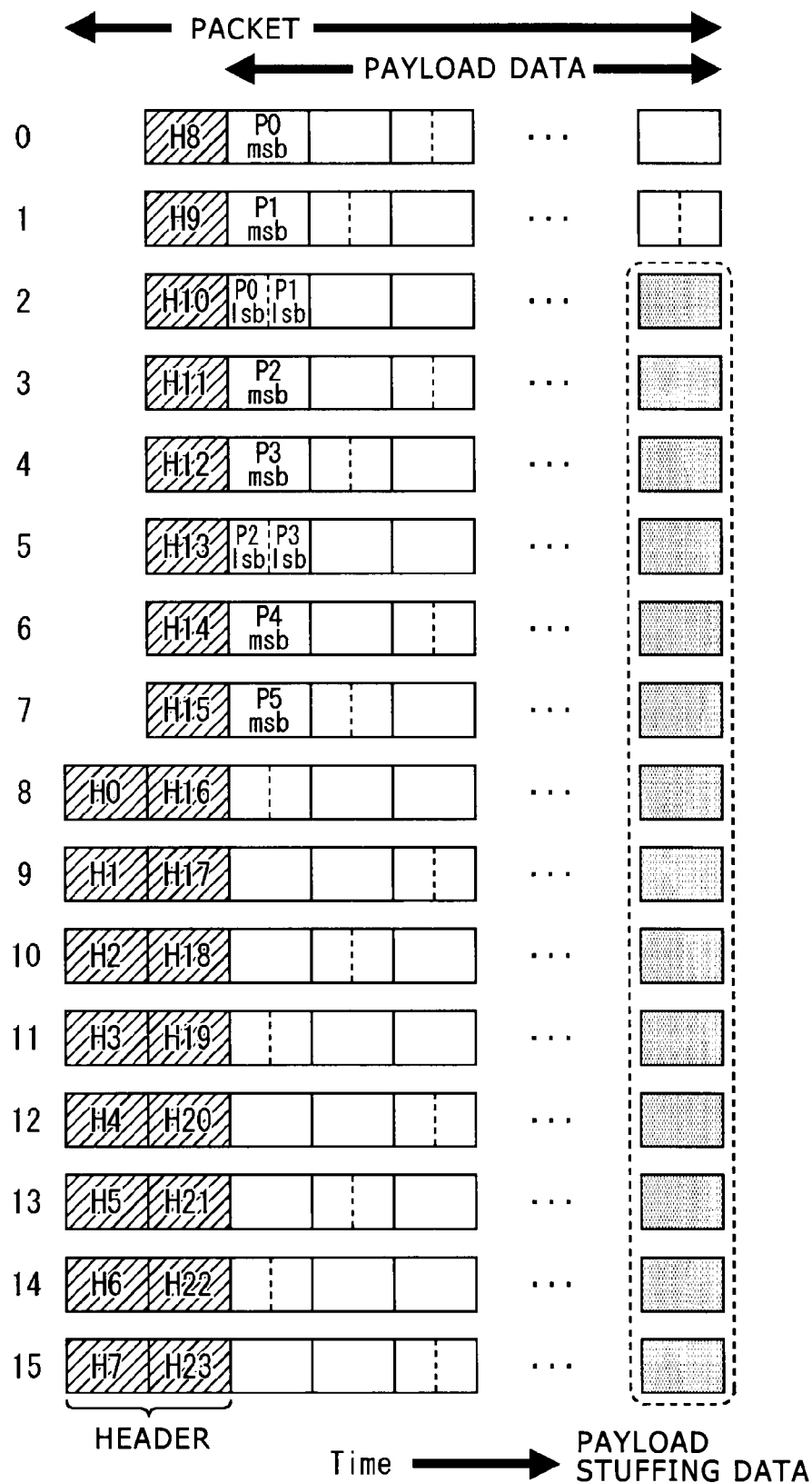
FIG. 17 is a diagrammatic view illustrating payload data to which a header is added.

FIG. 17 illustrates a state in which a header is added to payload data.

Referring to FIG. 17, 24 blocks to which characters H0 to H23 are added indicate header information or header data of a unit of a byte which is a CRC code of the header information. As described hereinabove with reference to FIG. 6, the header of one packet includes three sets of header information and a CRC code.

For example, header data H0 to H5 are header information of 6 bytes for a first set, and header data H6 and H7 are a CRC code of 2 bytes for the first set. Header data H8 to H13 are header information for a second set, and header data H14 and H15 are a CRC code for the second set. Header data H16 to H21 are header information for a third set, and header data H22 and H23 are a third set of a CRC code.

In the example of FIG. 17, the header data H0 to H7 are added to the payload data of the groups 8 to 15, respectively. Further, the header data H8 to H23 are added to the payload data of the groups 0 to 15, respectively.

Figure 18:
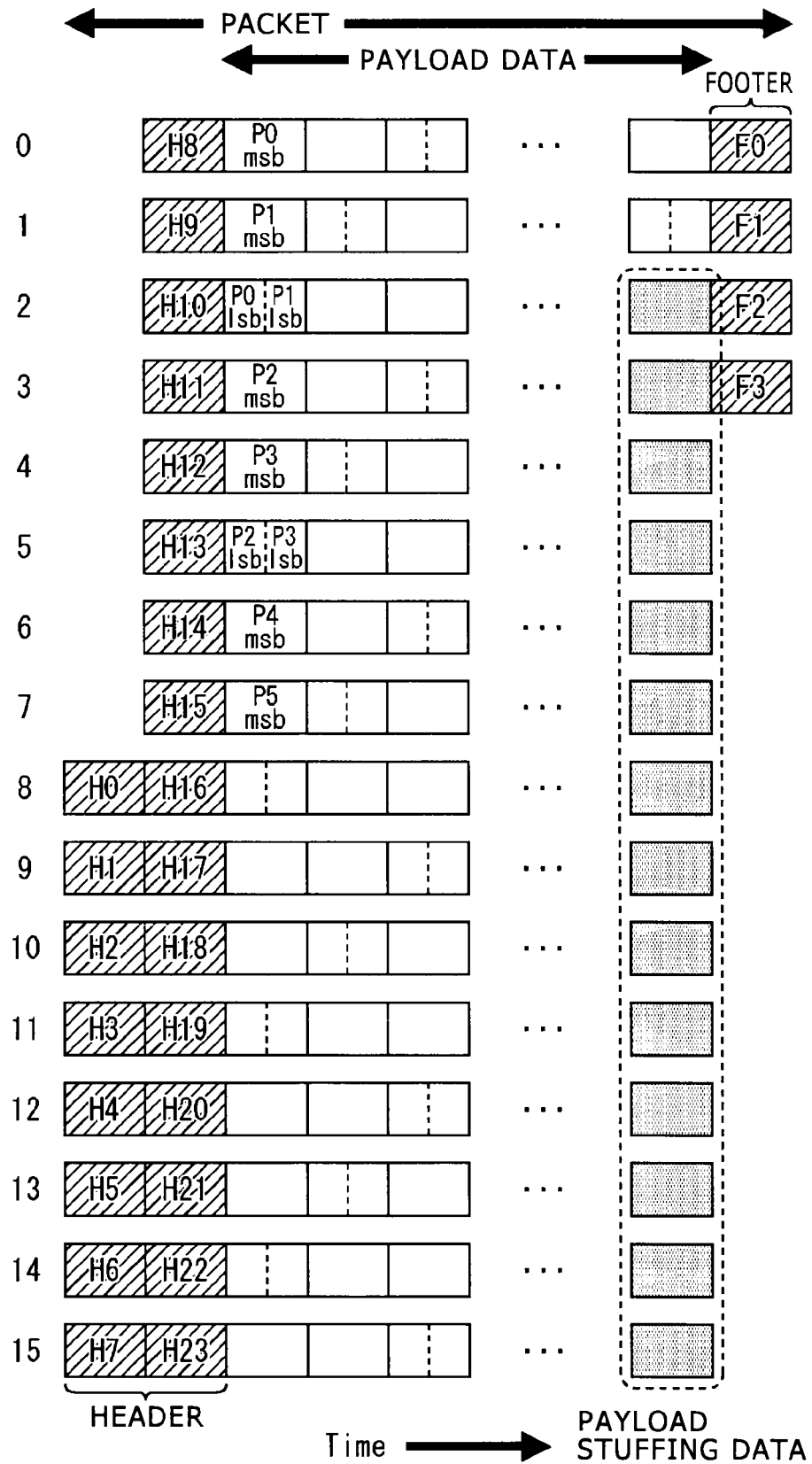
FIG. 18 is a diagrammatic view illustrating payload data to which a header and a footer are added.

FIG. 18 illustrates a state in which a header and a footer are added to payload data in which a parity is inserted.

Four blocks indicated by characters F0 to F3 added thereto represent foot data of a CRC code of 4 bytes produced as a footer. In the example of FIG. 18, the footer data F0 to F3 are added to the payload data of the groups 0 to 3, respectively.

Figure 19:
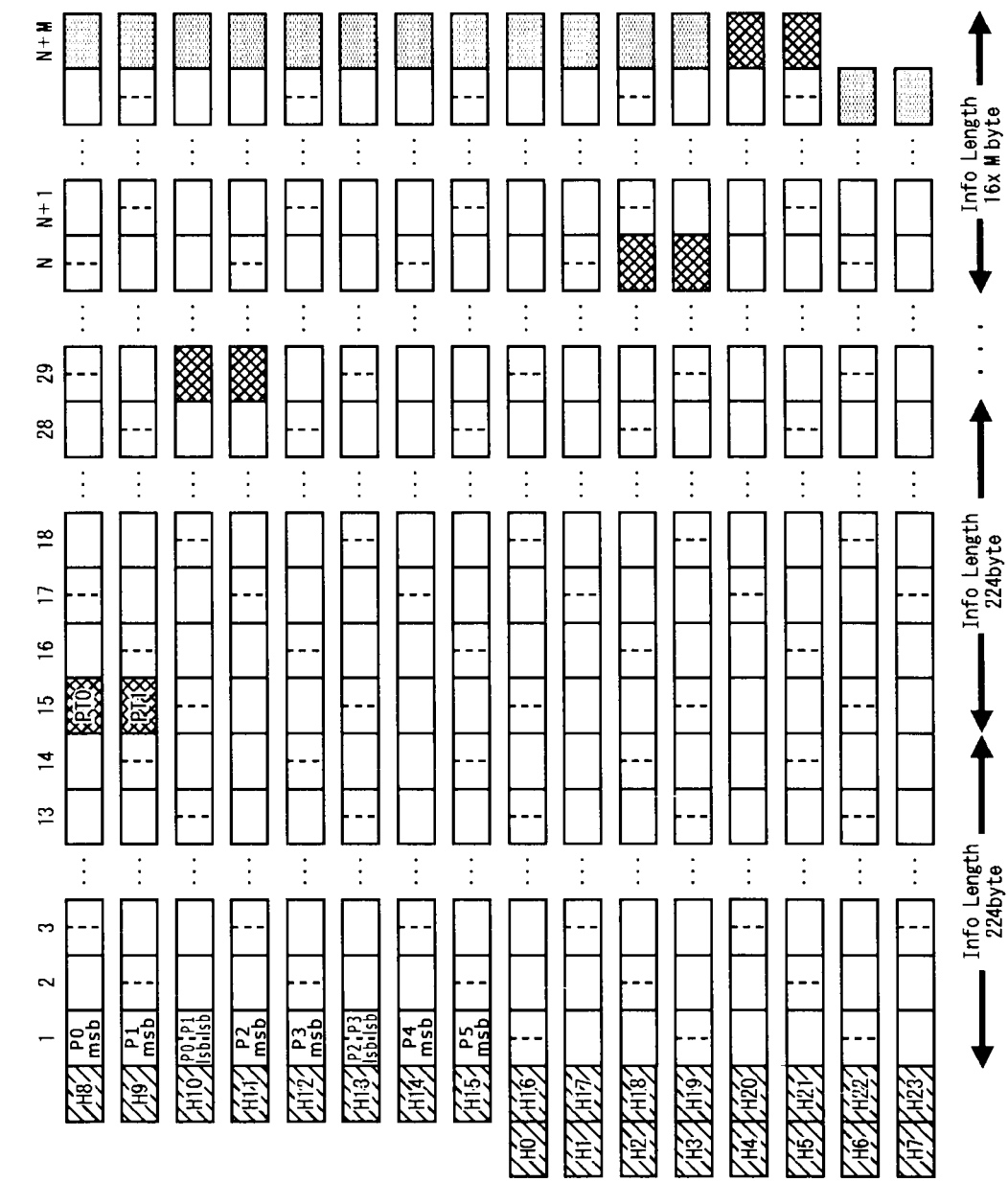
FIG. 19 is a diagrammatic view illustrating payload data in which a parity is inserted and to which a header is added.

FIG. 19 illustrates a state in which a header is added to payload data in which a parity is inserted.

In the example of FIG. 19, the header data H0 to H23 are added to the payload data of FIG. 16, in which a parity is inserted, similarly as in the cases of FIGS. 17 and 18.

The packet production section 64 outputs packet data, which are data which configure one packet produced in this manner, to the lane distribution section 65. To the lane distribution section 65, packet data configured from header data and payload data, packet data configured from header data, payload data and footer data, or packet data configured from header data and payload data in which a parity is inserted, are supplied. The packet structure of FIG. 6 is a logic one, and in the link layer and the physical layer, data of a packet having the structure of FIG. 6 is processed in a unit of a byte.

The lane distribution section 65 allocates packet data supplied thereto from the packet production section 64 in order beginning with the front data to those lanes which are to be used for data transmission from among the lanes Lane0 to Lane7.

Figure 20:
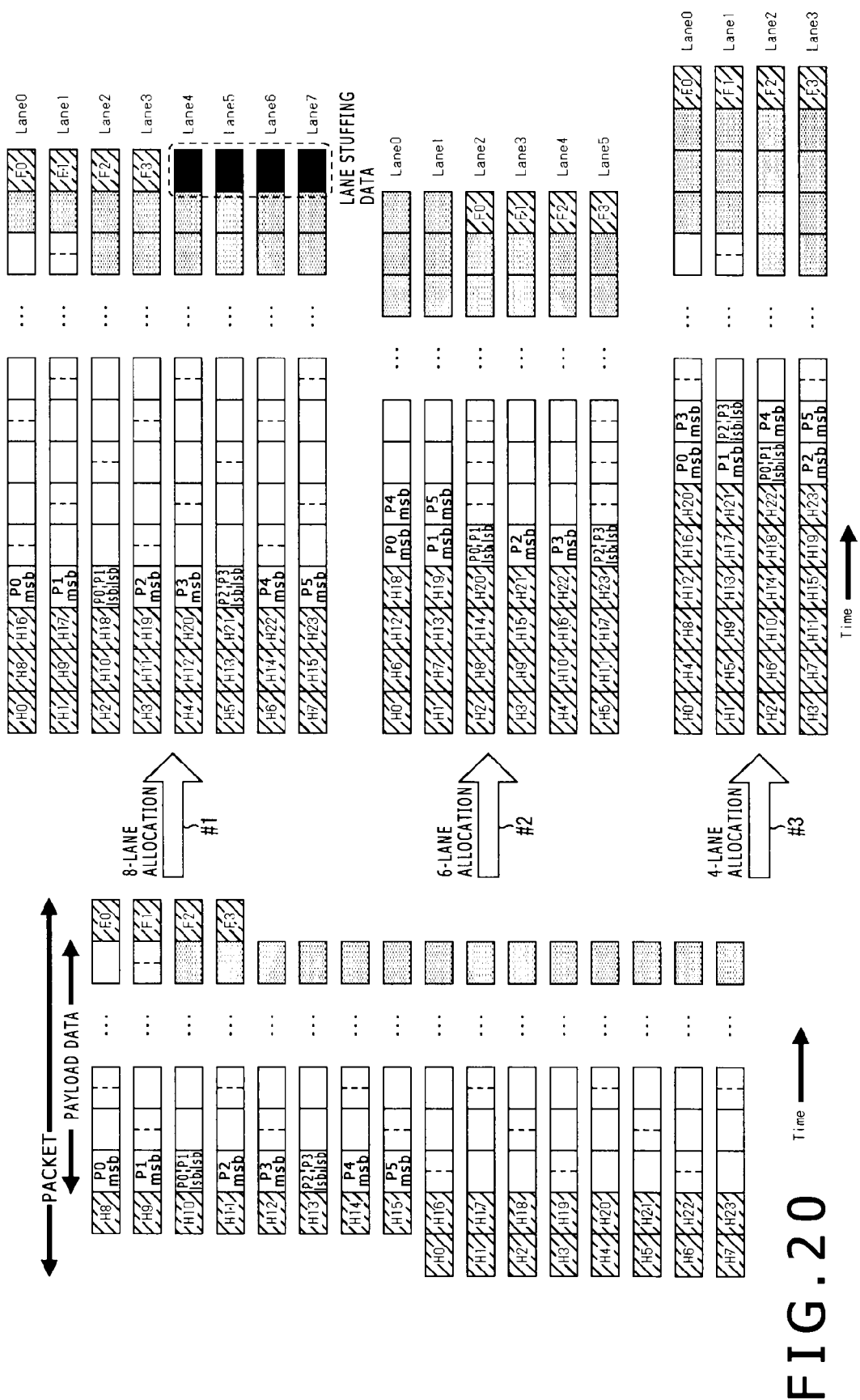
FIG. 20 is a diagrammatic view illustrating an example of allocation of packet data.

FIG. 20 illustrates an example of allocation of packet data.

Here, allocation of such packet data configured from header data, payload data and footer data as illustrated in FIG. 18 is described. An example of allocation of packet data in the case where data transmission is carried out using the eight lanes of Lane0 to Lane7 is illustrated ahead of a solid-white arrow mark #1.

In this instance, the header data H0 to H23 are allocated in order beginning with the front header data to the lanes Lane0 to Lane7. If certain header data is allocated to Lane7, then succeeding header data are successively allocated to the lanes beginning with Lane0. To each of the lanes Lane0 to Lane7, three header data are allocated.

Meanwhile, payload data are allocated in order beginning with the front payload data to the lanes Lane0 to Lane7. If certain payload data are allocated to Lane7, then succeeding payload data are successively allocated to the lanes beginning with Lane0.

Footer data F0 to F3 are allocated in order beginning with the front payload data to the lanes Lane0 to Lane7. In the example of FIG. 20, the last payload stuffing data which configures the payload data is allocated to Lane7, and the footer data F0 to F3 are allocated one by one to the lanes Lane0 to Lane3.

A block indicated in black represents lane stuffing data produced by the data insertion unit 73. The lane stuffing data is allocated to lanes having a smaller number of data so that the data lengths allocated to the lanes may be equal to each other. The lane stuffing data is data of one byte. In the example of FIG. 20, one lane stuffing data is allocated to each of the lanes Lane4 to Lane7 whose allocated data number is smaller.

The number of lane stuffing data in the case where packet data are configured from header data, payload data and footer data is represented by the following expression (5):

$$\text{LaneStuffing} = \text{LaneNum} - ((\text{PayloadLength} + \text{FooterLength}) \% \text{LaneNum}) \quad (5)$$

where LaneNum is the number of lanes, PayloadLength the payload data length (bytes), and FooterLength the footer length (bytes).

In the case where packet data are formed from header data and payload data in which a parity is inserted, the number of lane stuffing data is represented by the following expression (6) where ParityLength represents the total byte number of the parity included in the payload.

LaneStuffing=LaneNum−((PayloadLength+Parity-
Length)%LaneNum)    (6)

An example of allocation of packet data in the case where the six lanes Lane0 to Lane5 are used to carry out data transmission is illustrated ahead of a solid-white arrow mark #2.

In this instance, the header data H0 to H23 are allocated in order beginning with the front header data to the lanes Lane0 to Lane5. If certain header data is allocated to Lane5, then succeeding header data are allocated to the lanes in order beginning with Lane0. Four header data are allocated to each of the lanes Lane0 to Lane5.

Further, the payload data are allocated in order beginning with the front payload data to the lanes Lane0 to Lane5. If certain payload data are allocated to Lane5, then succeeding payload data are successively allocated to the lanes beginning with Lane0.

The footer data F0 to F3 are allocated in order beginning with the front footer data to the lanes. In the example of FIG. 20, the last payload stuffing data which configures payload data is allocated to Lane1, and the footer data F0 to F3 are allocated one by one to the lanes Lane2 to Lane5. Since the numbers of packet data of Lane0 to Lane5 are equal to each other, in this instance, no lane stuffing data is used.

An example of allocation of packet data in the case where data transmission is carried out using the four lanes of Lane0 to Lane3 is illustrated ahead of a solid-white arrow mark #3.

In this instance, the header data H0 to H23 are allocated in order beginning with the front header data to the lanes Lane0 to Lane3. If certain header data is allocated to Lane3, then succeeding header data are allocated to the lanes in order beginning with Lane0. Six header data are allocated to each of the lanes Lane0 to Lane3.

Further, the payload data are allocated in order beginning with the front payload data to the lanes Lane0 to Lane3. If certain payload data are allocated to Lane3, then succeeding payload data are successively allocated to the lanes beginning with Lane0.

The footer data F0 to F3 are allocated in order beginning with the front footer data to the lanes. In the example of FIG. 20, the last payload stuffing data which configures payload data is allocated to Lane3, and the footer data F0 to F3 are allocated one by one to the lanes Lane0 to Lane3. Since the numbers of packet data of Lane0 to Lane3 are equal to each other, in this instance, no lane stuffing data is used.

The lane distribution section 65 outputs packet data allocated to the lanes in this manner to the physical layer. In the following, description is given principally of a case in which data are transmitted using the eight lanes Lane0 to Lane7. However, similar processing is carried out also in a case in which the number of lanes to be used for data transmission is a different number.

[Configuration of the Physical Layer of the Transmission Block 22]

Now, a configuration of the physical layer of the transmission block 22 is described.

Referring back to FIG. 5, the transmission block 22 includes, as a configuration of the physical layer thereof, a PHY-TX state controlling section 81, a clock production section 82, and signal processing sections 83-0 to 83-N. The signal processing section 83-0 includes a controlling code insertion unit 91, an 8B10B symbol encoder 92, a synchronization unit 93, and a transmission unit 94. Packet data outputted from the lane distribution section 65 and allocated to Lane0 are inputted to the signal processing section 83-0 while packet data allocated to Lane1 are inputted to the signal processing section 83-1. Further, packet data allocated to LaneN are inputted to the signal processing section 83-N.

In this manner, the physical layer of the transmission block 22 includes a number of signal processing sections 83-0 to 83-N equal to the number of lanes such that processing of packet data to be transmitted using the lanes is carried out in parallel by the signal processing sections 83-0 to 83-N. Although the configuration of the signal processing section 83-0 is described below, also the signal processing sections 83-1 to 83-N have a similar configuration.

The PHY-TX state controlling section 81 controls the signal processing sections 83-0 to 83-N. For example, the PHY-TX state controlling section 81 controls timings of processes to be carried out by the signal processing sections 83-0 to 83-N.

The clock production section 82 produces a clock signal and outputs the clock signal to the synchronization unit 93 of the signal processing sections 83-0 to 83-N.

The controlling code insertion unit 91 of the signal processing section 83-0 adds a controlling code to packet data supplied thereto from the lane distribution section 65. The controlling code is a code represented by a single symbol selected from among a plurality of different symbols prepared in advance or a combination of a plurality of different symbols. Each symbol inserted by the controlling code insertion unit 91 is data of 8 bits. The inserted one symbol by the controlling code insertion unit 91 is subjected to 8B10B conversion by a circuit at a succeeding stage so that it is converted into data of 10 bits. On the other hand, the reception block 31 carries out 10B8B conversion for reception data as hereinafter described. Each symbol before the 10B8B conversion included in the reception data is 10-bit data, and each symbol after the 10B8B conversion is 8-bit data.

FIG. 21 illustrates an example of controlling codes to be added by the controlling code insertion unit 91.

As the controlling codes, Idle Code, Start Code, End Code, Pad Code, Sync Code, Deskew Code and Standby Code are available.

Idle Code is a symbol group transmitted repetitively within a period other than a period of transmission of packet data. Idle Code is represented by D00.0 (00000000) of D Character which is the 8B10B Code.

Start Code is a symbol group representative of a start of a packet. As described hereinabove, Start Code is added to the front of a packet. Start code is represented by four symbols of K28.5, K27.7, K28.2 and K27.7 which are a combination of three kinds of K Character. K Character values are indicated in FIG. 22.

End Code is a symbol group representative of a tail end of a packet. As described hereinabove, End Code is added to the rear of a packet. End Code is represented by four symbols of K28.5, K29.7, K30.7 and K29.7 which are a combination of three kinds of K Character.

Pad Code is a symbol group which is inserted into payload in order to fill up the difference between a pixel data band and a PHY transmission band. The pixel data band is a transmission rate of pixel data outputted from the imaging section 21 and inputted to the transmission block 22, and the PHY transmission band is a transmission rate of pixel data transmitted from the transmission block 22 and inputted to the reception block 31. Pad Code is represented by four symbols of K23.7, K28.4, K28.6 and K28.7 which are a combination of four kinds of K Character.

Figure 23:
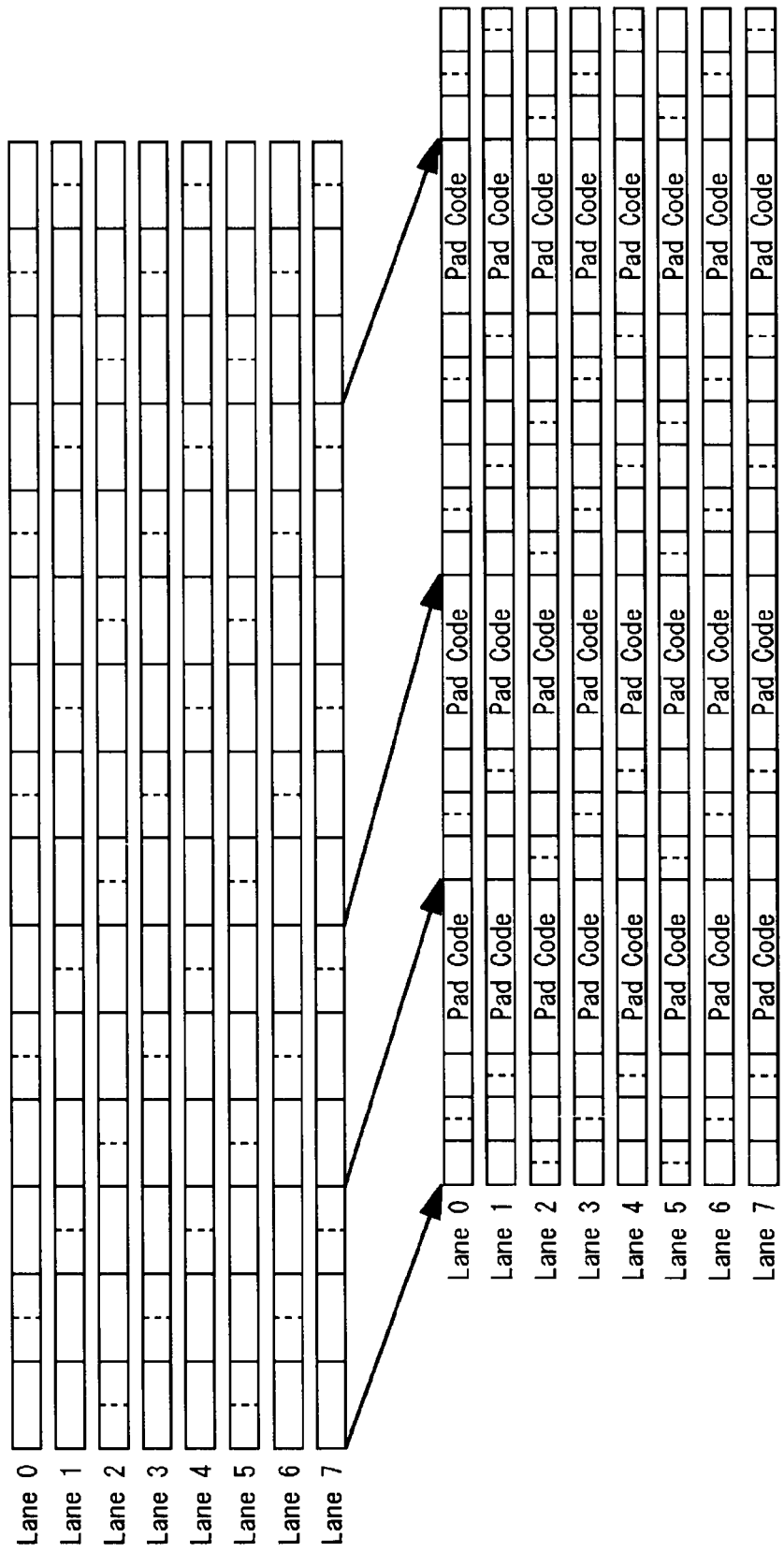
FIG. 23 is a diagrammatic view illustrating an example of insertion of Pad Code.

FIG. 23 illustrates an example of insertion of Pad Code.

The upper stage of FIG. 23 illustrates payload data allocated to different lanes before insertion of Pad Code, and the lower stage illustrates the payload data after the insertion of Pad Code. In the example of FIG. 22, Pad Code is inserted between the third pixel data and the fourth pixel data from the front pixel data, between the sixth pixel data and the seventh pixel data, between the twelfth pixel data and the thirteenth pixel data. In this manner, Pad Code is inserted at the same position of payloads of the lanes Lane0 to Lane7.

Insertion of Pad Code into payload data allocated to Lane0 is carried out by the controlling code insertion unit 91 of the signal processing section 83-0. Also insertion of Pad Code into the payload allocated to any other lane is carried out similarly at the same timing by the signal processing sections 83-1 to 83-N. The number of Pad Code is determined based on the difference between the pixel data band and the PHY transmission band, the frequency of the clock signal produced by the clock production section 82 and so forth.

In this manner, PAD code is inserted, in the case where the pixel data band is narrow and the PHY transmission band is wide, in order to adjust the difference between the bands. For example, the difference between the pixel data band and the PHY transmission band is adjusted so that it may fall within a fixed range by the insertion of PAD code.

Referring back to FIG. 21, Sync Code is used to assure bit synchronism and symbol synchronism between the transmission block 22 and the reception block 31. Sync Code is represented by two symbols of K28.5 and Any. Any represents that any kind of symbol may be used. Sync Code is transmitted repetitively, for example, in a training mode before transmission of packet data is started between the transmission block 22 and the reception block 31.

Deskew Code is a symbol group used for correction of Data Skew between lanes, that is, for correction of displacement in reception timing of data received by the lanes of the reception block 31. Deskew Code is represented by two symbols of K28.5 and Any**. Correction of Data Skew between lanes using Deskew Code is hereinafter described.

Standby Code is a symbol group used for notifying the reception block 31 that the output of the transmission block 22 enters such a state as a High-Z (high impedance) state and data transmission is disabled. In particular, Standby Code is transmitted to the reception block 31 when transmission of packet data comes to an end and a Standby state is entered. Standby Code is represented by 2 symbols of K28.5 and Any**.

The controlling code insertion unit 91 outputs packet data to which such controlling codes as described above are added to the 8B10B symbol encoder 92.

Figure 24:
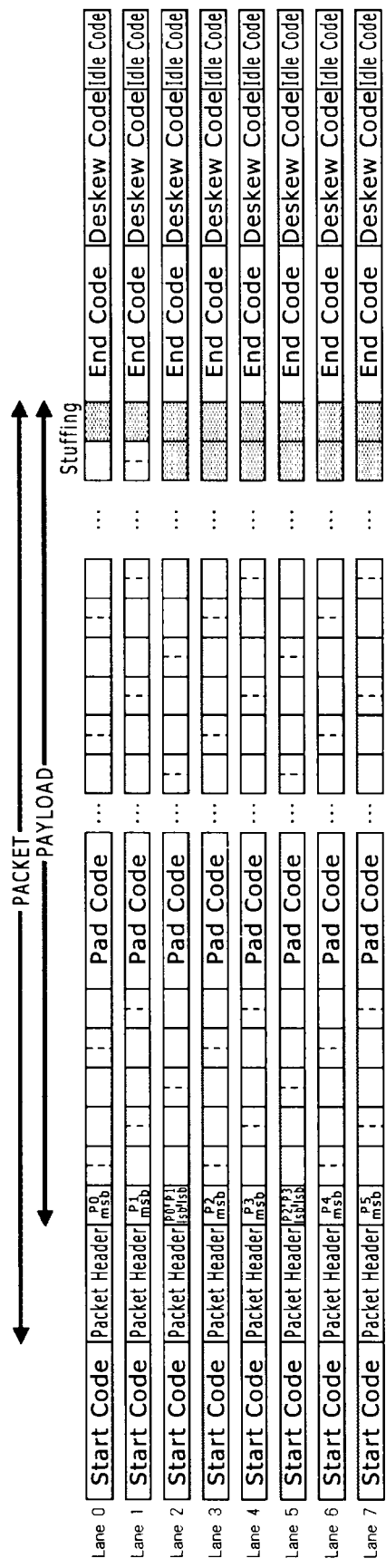
FIG. 24 is a diagrammatic view illustrating an example of packet data after insertion of a controlling code.

FIG. 24 illustrates an example of packet data after controlling code insertion.

Referring to FIG. 24, the signal processing sections 83-0 to 83-N individually add Start Code to the front of packet data and insert Pad Code into the payload data. End Code is added to the rear of the packet data, and Deskew Code is added to the rear of End Code. In the example of FIG. 24, Idle Code is added to the rear of Deskew code.

The 8B10B symbol encoder 92 carries out 8B10B conversion for packet data supplied thereto from the controlling code insertion unit 91 and having controlling codes added thereto, and outputs the packet data converted into data of a unit of 10 bits to the synchronization unit 93.

The synchronization unit 93 outputs bits of the packet data supplied thereto from the 8B10B symbol encoder 92 to the transmission unit 94 in accordance with the clock signal produced by the clock production section 82.

The transmission unit 94 transmits the packet data supplied thereto from the synchronization unit 93 to the reception block 31 through a transmission line which configures Lane0. In the case where data transmission is carried out using eight lanes, also transmission lines which configure Lane1 to Lane7 are used to transmit packet data to the reception block 31.

[Configuration of the Physical Layer of the Reception Block 31]

Now, a configuration of the physical layer of the reception block 31 is described.

Referring to FIG. 5, the reception block 31 includes, as a configuration of the physical layer, a PHY-RX state controlling section 101, and signal processing sections 102-0 to 102-N. The signal processing section 102-0 includes a reception unit 111, a clock production unit 112, a synchronization unit 113, a symbol synchronization unit 114, an 10B8B symbol decoder 115, a skew correction unit 116, and a controlling code removal unit 117. Packet data transmitted through a transmission line which configures Lane0 are inputted to the signal processing section 102-0, and packet data transmitted through a transmission line which configures Lane1 are inputted to the signal processing section 102-1. Further, packet data transmitted through a transmission line which configures LaneN are inputted to the signal processing section 102-N.

In this manner, a number of signal processing sections 102-0 to 102-N equal to the number of lanes are provided in the physical layer of the reception block 31 such that processing of packet data transmitted using the lanes is individually carried out in parallel by the signal processing sections 102-0 to 102-N. Although description is given below of the configuration of the signal processing section 102-0, also the signal processing sections 102-1 to 102-N have a similar configuration.

The reception unit 111 receives a signal representative of packet data transmitted thereto from the transmission block 22 through the transmission line which configures Lane0 and outputs the signal to the clock production unit 112.

The clock production unit 112 detects an edge of a signal supplied thereto from the reception unit 111 to establish bit synchronism and produces a clock signal based on the detection period of the edge. The clock production unit 112 outputs the signal supplied thereto from the reception unit 111 to the synchronization unit 113 together with the clock signal.

The synchronization unit 113 carries out sampling of a signal received by the reception unit 111 in accordance with the clock signal produced by the clock production unit 112 and outputs packet data obtained by the sampling to the symbol synchronization unit 114. The clock production unit 112 and the synchronization unit 113 implement a function for CDR (Clock Data Recovery).

The symbol synchronization unit 114 detects a controlling code included in packet data or detects some symbol included in the controlling code to establish symbol synchronism. For example, the symbol synchronization unit 114 detects a symbol of K28.5 included in Start Code, End Code or DeSkew Code to establish bit synchronism. The symbol synchronization unit 114 outputs packet data in a unit of 10 bits representative of each symbol to the 10B8B symbol decoder 115.

Further, the symbol synchronization unit 114 detects, in a training mode before transmission of packet data is started, a boundary between symbols included in Sync Code repetitively transmitted thereto from the transmission block 22 to establish symbol synchronism.

The 10B8B symbol decoder 115 carries out 10B8B conversion for packet data in a unit of 10 bits supplied thereto from the symbol synchronization unit 114 and outputs packet data obtained by conversion into data of a unit of 8 bits to the skew correction section 116.

The skew correction unit 116 detects Deskew Code from among packet data supplied thereto from the 10B8B symbol decoder 115. Information on the detection timing of Deskew Code by the skew correction unit 116 is supplied to the PHY-RX state controlling section 101.

Further, the skew correction unit 116 adjusts the timing of Deskew Code to a timing represented by information supplied thereto from the PHY-RX state controlling section 101 to correct Data Skew between the lanes. From the PHY-RX state controlling section 101, information representative of the latest timing from among timings of Deskew Code detected by the signal processing sections 102-0 to 102-N is supplied.

Figure 25:
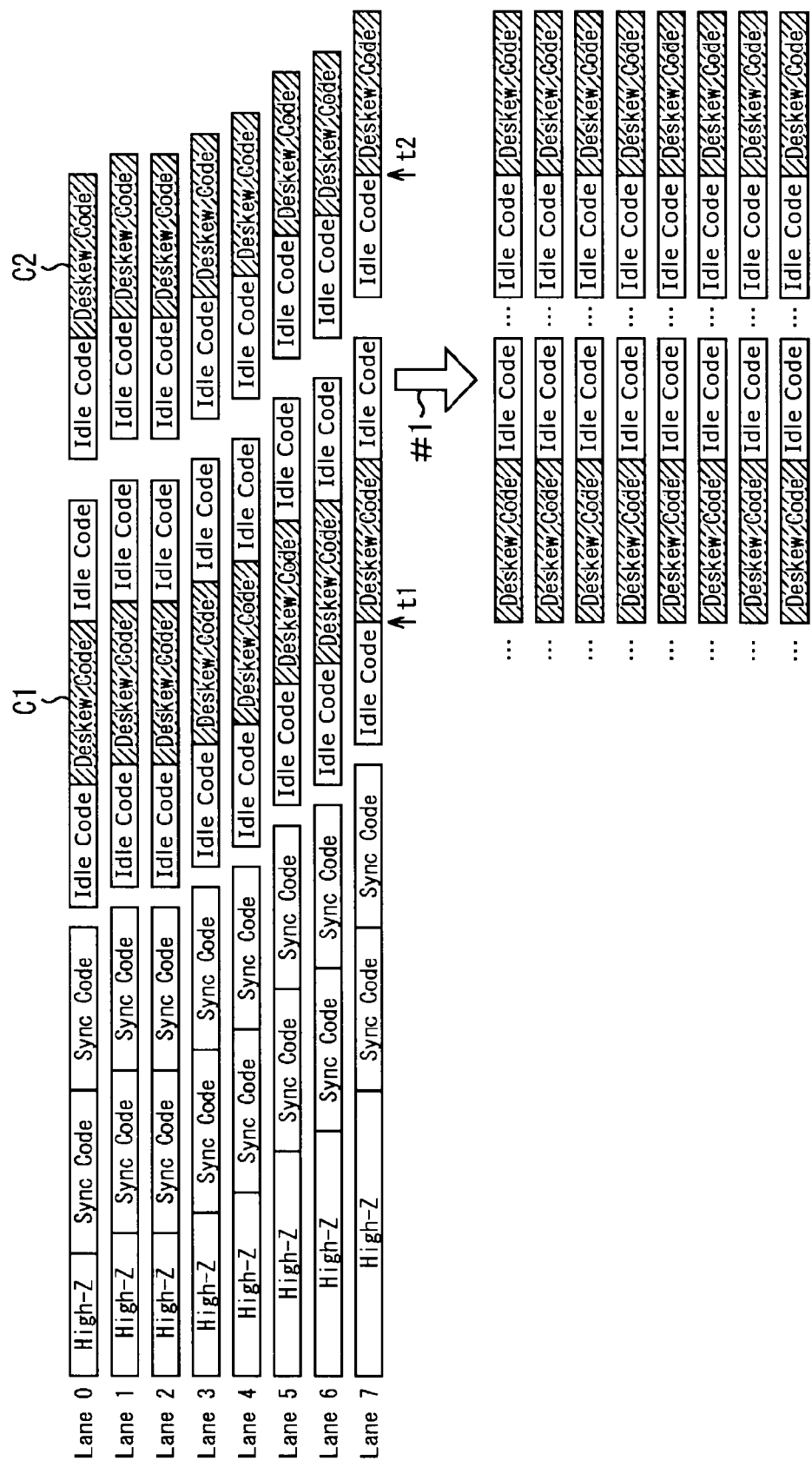
FIG. 25 is a diagrammatic view illustrating an example of correction of Data Skew.

FIG. 25 illustrates an example of correction of Data Skew between lanes using Deskew Code.

Referring to FIG. 25, in the example illustrated, transmission of Sync Code, Sync Code, . . . , Idle Code, Deskew Code, Idle Code, . . . Idle Code, Deskew Code is carried out through each of the lanes Lane0 to Lane7, and the controlling codes are received by the reception block 31. The reception timings of the same controlling code are different among the different lanes, and Data Skew is exhibited between different lanes.

In this instance, the skew correction unit 116 detects Deskew Code C1 which is the first Deskew Code and corrects the timing of the front of Deskew Code C1 so as to coincide with time t1 represented by information supplied thereto from the PHY-RX state controlling section 101. From the PHY-RX state controlling section 101, information on the time t1 at which Deskew Code C1 is detected in regard to Lane7 which exhibits the latest timing from among the timings at which Deskew Code C1 is detected in regard to the lanes Lane0 to Lane7 is supplied.

Further, the skew correction unit 116 detects Deskew Code C2 which is the second Deskew Code and corrects the timing of the front of Deskew Code C2 so as to coincide with time t2 represented by information supplied thereto from the PHY-RX state controlling section 101. From the PHY-RX state controlling section 101, information at time t2 at which Deskew Code C2 is detected in regard to Lane7 which exhibits the latest timing from among timings at which Deskew Code C2 is detected in regard to the lanes of Lane0 to Lane7 is supplied.

The signal processing sections 102-1 to 102-N individually carry out similar processing to correct Data Skew between the lanes as indicated ahead of an arrow mark #1 in FIG. 25.

The skew correction unit 116 outputs packet data whose Data Skew is corrected to the controlling code removal unit 117.

The controlling code removal unit 117 removes controlling codes added to packet data and outputs data from Start Code to End Code as packet data to the link layer.

The PHY-RX state controlling section 101 controls the components of the signal processing sections 102-0 to 102-N to carry out correction of Deskew Code between lanes. Further, if a transmission error occurs in a predetermined lane and a controlling code is lost, then the PHY-RX state controlling section 101 adds the controlling code transmitted through a different lane in place of the lost controlling code to carry out error correction of the controlling code.

[Configuration of the Link Layer of the Reception Block 31]

Now, a configuration of the link layer of the reception block 31 is described.

Referring to FIG. 5, the reception block 31 includes, as a configuration of the link layer, a LINK-RX protocol management section 121, a lane integration section 122, a packet separation section 123, a payload error correction section 124 and a Byte to Pixel conversion section 125. The LINK-RX protocol management section 121 includes a state management unit 131, a header error correction unit 132, a data removal unit 133, and a footer error detection unit 134.

The lane integration section 122 re-arranges packet data supplied thereto from the signal processing sections 102-0 to 102-N of the physical layer so that the order of the packet data is reversed from the distribution order to the lanes by the lane distribution section 65 of the transmission block 22 thereby to integrate the packet data.

For example, if the distribution of packet data by the lane distribution section 65 is carried out in such a manner as indicated ahead of the arrow mark #1 of FIG. 20, then packet data on the left side in FIG. 20 are acquired by the integration of the packet data from the lanes carried out by the lane integration section 122. Upon integration of the packet data of the lanes, the lane stuffing data are removed by the lane integration section 122 under the control of the data removal unit 133. The lane integration section 122 outputs the integrated packet data to the packet separation section 123.

The packet separation section 123 separates packet data for one packet integrated by the lane integration section 122 into packet data which configure header data and packet data which configure payload data. The packet separation section 123 outputs the header data to the header error correction unit 132 and outputs the payload data to the payload error correction section 124.

Further, if the packet includes a footer, then the packet separation section 123 separates data for one packet into packet data which configure the header data, packet data which configure the payload data and packet data which configure the footer data. The packet separation section 123 outputs the header data to the header error correction unit 132 and outputs the payload data to the payload error correction section 124. Further, the packet separation section 123 outputs the footer data to the footer error detection unit 134.

If the payload data supplied from the packet separation section 123 include a parity inserted therein, then the payload error correction section 124 carries out error correction arithmetic operation based on the parity to detect an error of the payload data and carries out correction of the detected error. For example, if a parity is inserted in such a manner as seen in FIG. 16, then the payload error correction section 124 uses two parities inserted at the last of the first Basic Block to carry out error correction of the 224 pixel data preceding to the parities.

The payload error correction section 124 outputs pixel data after error correction obtained by carrying out error correction for each Basic Block and Extra Block to the Byte to Pixel conversion section 125. If no parity is inserted in payload data supplied from the packet separation section 123, then the payload data supplied from the packet separation section 123 are outputted as they are to the Byte to Pixel conversion section 125.

The Byte to Pixel conversion section 125 removes payload stuffing data included in the payload data supplied thereto from the payload error correction section 124 under the control of the data removal unit 133.

Further, the Byte to Pixel conversion section 125 carries out Byte to Pixel conversion of data of pixels in a unit of a byte obtained by removal of payload stuffing data into pixel data of a unit of 8 bits, 10 bit, 12 bits, 14 bits or 16 bits. The Byte to Pixel conversion section 125 carries out conversion reverse to the Pixel to Byte conversion by the Pixel to Byte conversion section 62 of the transmission block 22 described hereinabove with reference to FIGS. 9 to 13.

The Byte to Pixel conversion section 125 outputs the pixel data of a unit of 8 bits, 10 bits, 12 bits, 14 bits or 16 bits obtained by the Byte to Pixel conversion to the frame data outputting section 141. The frame data outputting section 141 produces, based on the pixel data obtained by the Byte to Pixel conversion section 125, lines of valid pixels specified, for example, by Line Valid of the header information. The lines are arranged in accordance with Line Number of the header information to produce an image of one frame.

The state management unit 131 of the LINK-RX protocol management section 121 manages the state of the link layer of the reception block 31.

The header error correction unit 132 acquires three sets of header information and a CRC code based on header data supplied thereto from the packet separation section 123. The header error correction unit 132 carries out, for each of the sets of header information of a CRC code, error detection arithmetic operation, which is arithmetic operation for detecting an error of header information, using the header information and the CRC code in the same set.

Further, the header error correction unit 132 estimates correct header information based on at least one of an error correction result of header information of each set and a comparison result of data determined by error detection arithmetic operation, and outputs the header information, which is estimated to be correct, and the decoding result. The data determined by the error detection arithmetic operation is a value determined by applying the generating polynomial for a CRC to the header information. Further, the decoding result is information representative of a success in decoding or a failure in decoding.

The three sets of header information and a CRC code are referred to as set 1, set 2 and set 3. In this instance, the header error correction unit 132 carries out error detection arithmetic operation for the set 1 to acquire information regarding whether or not the header information of the set 1 includes an error, that is, an error detection result, and data 1 which is data determined by the error detection arithmetic operation. Further, the header error correction unit 132 carries out error detection arithmetic operation for the set 2 to acquire information regarding whether or not the header information of the set 2 includes an error and data 2 which is data determined by the error detection arithmetic operation. Furthermore, the header error correction unit 132 carries out error detection arithmetic operation for the set 3 to acquire information regarding whether or not the header information of the set 3 includes an error and data 3 which is data determined by the error detection arithmetic operation.

Further, the header error correction unit 132 decides whether or not the data 1 and the data 2 coincide with each other, whether or not the data 2 and the data 3 coincide with each other, and whether or not the data 3 and the data 1 coincide with each other.

For example, if no error is detected by the error detection arithmetic operation for the set 1, set 2 and set 3 and comparison results of data determined by the error detection arithmetic operation coincide with each other, then the header error correction unit 132 selects information representative of success in decoding as a decoding result. Further, the header error correction unit 132 estimates that all header information is correct and selects one of the header information of the set 1, header information of the set 2 and header information of the set 3 as output information.

On the other hand, if an error is not detected only in the error detection arithmetic operation for the set 1, then the header error correction unit 132 selects information representative of success in decoding as a decoding result, estimate that the header information of the set 1 is correct, and selects the header information of the set 1 as output information.

However, if an error is not detected only in the error detection arithmetic operation for the set 2, the header error correction unit 132 selects information representative of success in decoding as a decoding result, estimates that the header information of the set 2 is correct, and selects the header information of the set 2 as output information.

Further, if an error is not detected only in the error detection arithmetic operation for the set 3, the header error correction unit 132 selects information representative of success in decoding as a decoding result, estimates that the header information of the set 3 is correct, and selects the header information of the set 3 as output information.

The header error correction unit 132 outputs a decoding result selected in such a manner as described above and output information to the register 142 so as to be stored. In this manner, the error correction of header information by the header error correction unit 132 is carried out by detection of header information which does not have an error using a CRC code and outputting of the detected header information.

The data removal unit 133 controls the lane integration section 122 to remove lane stuffing data and controls the Byte to Pixel conversion section 125 to remove payload stuffing data.

The footer error detection unit 134 acquires a CRC code placed in the footer based on footer data supplied from the packet separation section 123. The footer error detection unit 134 carries out error detection arithmetic operation using the acquired CRC code to detect an error of the payload data. The footer error detection unit 134 outputs an error detection result so as to be stored into the register 142.

<Operation of the Image Sensor 11 and the DSP 12>

Now, a series of processes of the transmission block 22 and the reception block 31 which have such a configuration as described above are described.

Figure 26:
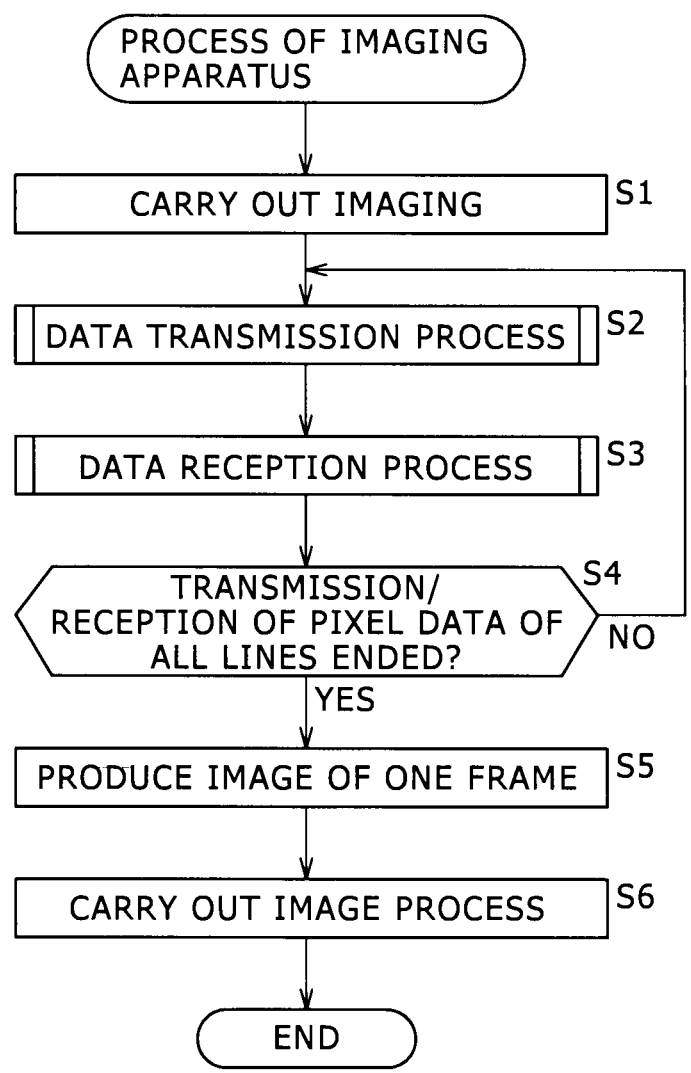
FIG. 26 is a flow chart illustrating a process of an imaging apparatus.

First, operation of an imaging apparatus which has the transmission system 1 is described with reference to a flow chart of FIG. 26. The process of FIG. 26 is started, for example, when a shutter button provided on the imaging apparatus is depressed to issue an instruction to start imaging.

First at step S1, the imaging section 21 of the image sensor 11 carries out imaging. The frame data inputting section 52 shown in FIG. 5 of the imaging section 21 outputs image data which configure an image of one frame obtained by the imaging in order one by one pixel data.

At step S2, a data transmission process by the transmission block 22 is carried out. By the data transmission process, a packet having pixel data for one line placed in the payload thereof is produced, and packet data which configure the packet are transmitted to the reception block 31. The data transmission process is hereinafter described with reference to a flowchart of FIG. 27.

At step S3, a data reception process is carried out by the reception block 31. By the data reception process, the packet data transmitted from the transmission block 22 are received, and the pixel data placed in the payload are outputted to the image processing block 32. The data reception process is hereinafter described with reference to a flow chart of FIG. 28.

The data transmission process carried out by the transmission block 22 at step S2 and the data reception process carried out by the reception block 31 at step S3 are carried out alternately for pixel data for one line. In particular, when pixel data of one line are transmitted by the data transmission process, the data reception process is carried out, and when pixel data for one line are received by the data reception process, the data transmission process is carried out for pixel data of a next one line. The data transmission process by the transmission block 22 and the data reception process by the reception block 31 are sometimes carried out suitably in parallel in time. At step S4, the frame data outputting section 141 of the image processing block 32 decides whether or not transmission and reception of pixel data of all lines which configure an image of one frame end. If it is decided that transmission and reception do not end, then the processes at steps beginning with step S2 are carried out repetitively.

If it is decided at step S4 that transmission and reception of pixel data of all lines which configure an image of one frame end, then the frame data outputting section 141 of the image processing block 32 produces an image of one frame based on the pixel data supplied thereto from the reception block 31 at step S5.

At step S6, the image processing block 32 carries out an image process using the image of one frame and then ends the processing.

Figure 27:
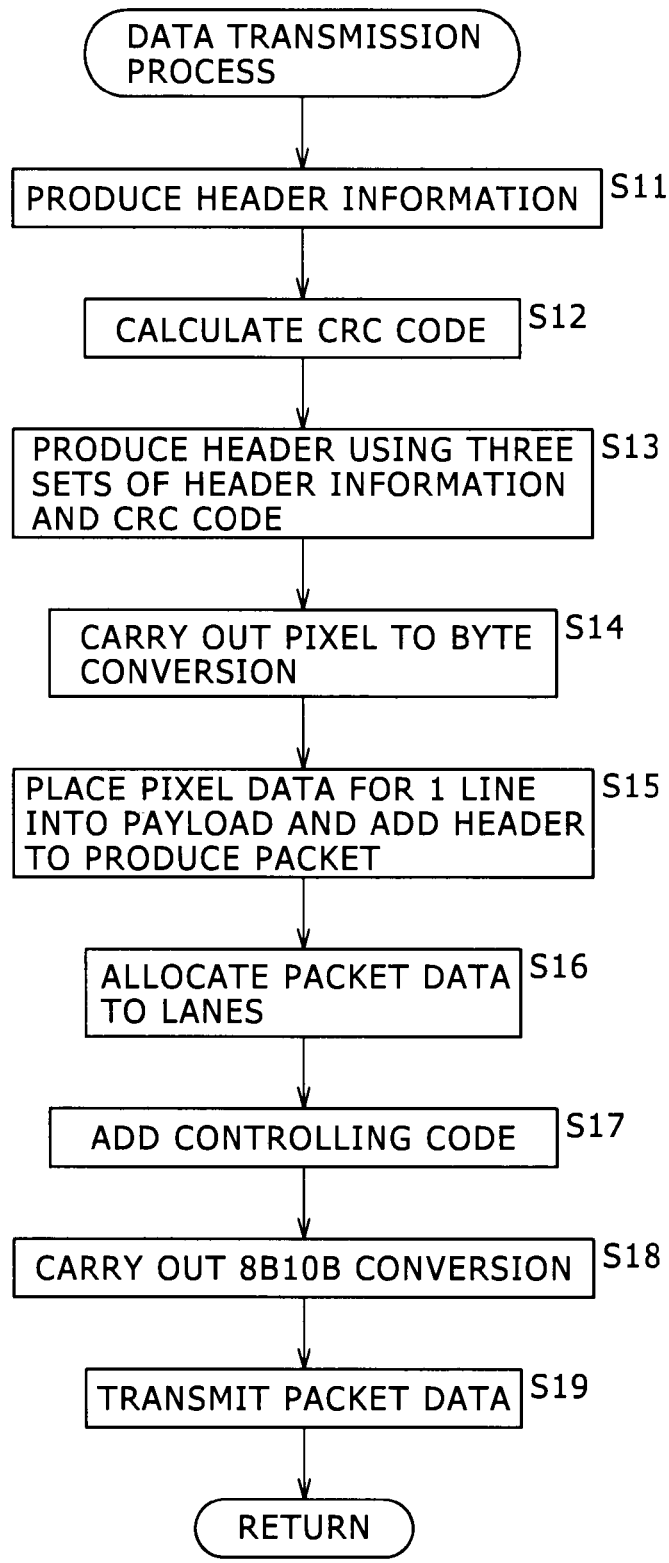
FIG. 27 is a flow chart illustrating a data transmission process carried out at step S2 of FIG. 26.

Now, the data transmission process carried out at step S2 of FIG. 26 is described with reference to a flow chart of FIG. 27.

At step S11, the header production unit 72 produces header information including Frame Start, Frame End, Line Valid, Line Number and Reserved.

At step S12, the header production unit 72 calculates a CRC code applying the header information to the generating polynomial.

At step S13, the header production unit 72 adds the CRC code to the header information to produce a set of the header information and the CRC code and disposes three such sets of header information and CRC code repetitively to produce a header.

At step S14, the Pixel to Byte conversion section 62 acquires the pixel data supplied from the frame data inputting section 52 and carries out Pixel to Byte conversion of the image data. The Pixel to Byte conversion section 62 outputs payload data produced by carrying out grouping of the image data in a unit of a byte obtained by the Pixel to Byte conversion, addition of payload stuffing data and so forth. Into the payload data, a parity is inserted suitably by the payload ECC insertion section 63.

At step S15, the packet production section 64 produces a packet based on the payload including image data for one line and the header produced by the header production unit 72, and outputs packet data which configure one packet.

At step S16, the lane distribution section 65 allocates the packet data supplied thereto from the packet production section 64 to a plurality of lanes to be used for data transmission.

At step S17, the controlling code insertion unit 91 adds controlling codes to the packet data supplied thereto from the lane distribution section 65.

At step S18, the 8B10B symbol encoder 92 carries out 8B10B conversion of the packet data to which the controlling codes are added and outputs the packet data after the conversion into data in a unit of 10 bits.

At step S19, the synchronization unit 93 outputs the packet data supplied from the 8B10B symbol encoder 92 in accordance with the clock signal produced by the clock production section 82 so that the packet data are transmitted from the transmission unit 94. The processes at steps S17 to S19 are carried out in parallel by the signal processing sections 83-0 to 83-N. When the transmission of image data for one line ends, the processing returns to step S2 of FIG. 26 such that the processes at the steps beginning with step S2 are carried out.

Figure 28:
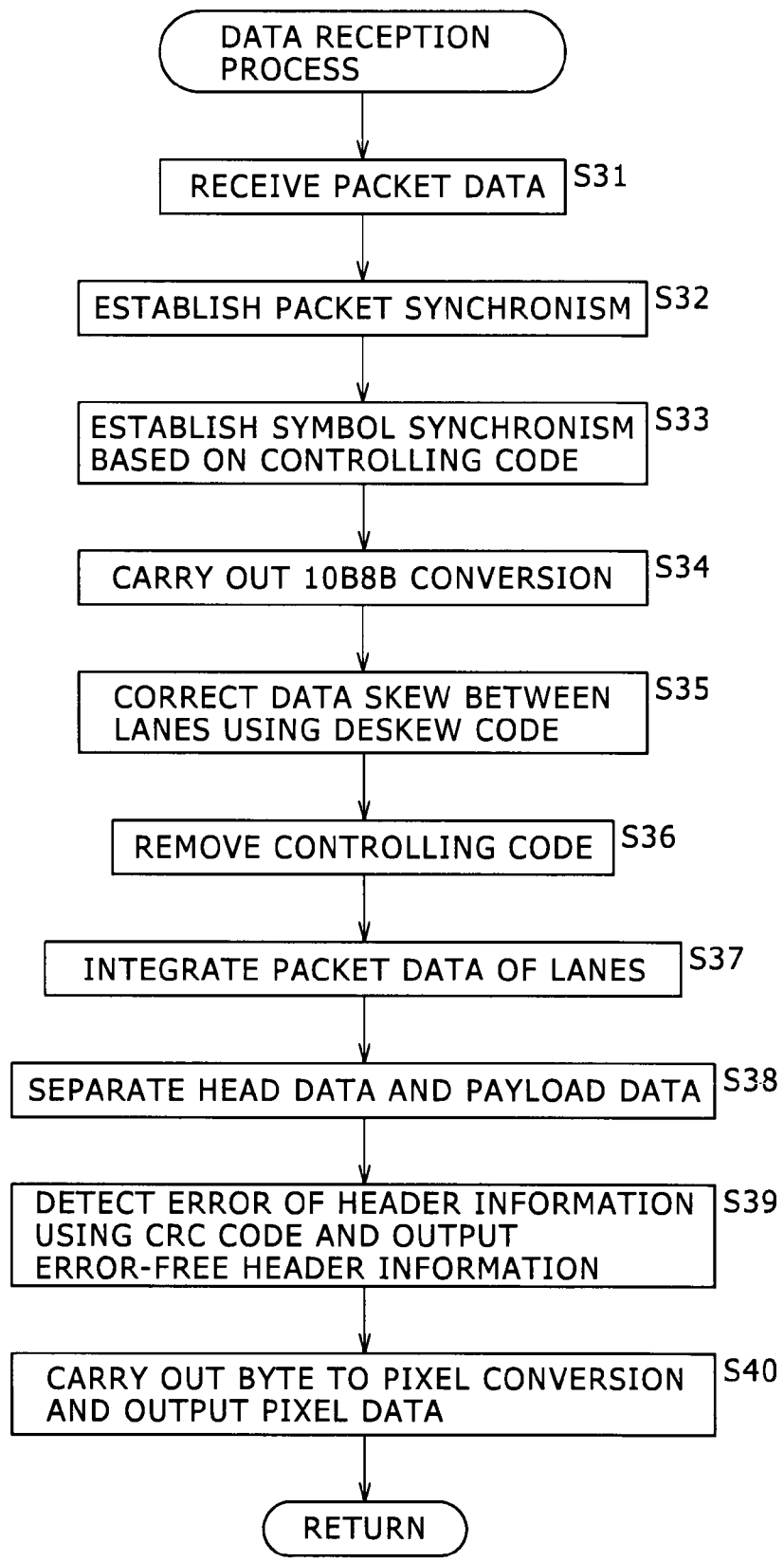
FIG. 28 is a flow chart illustrating a data reception process carried out at step S3 of FIG. 26.

Now, the data reception process carried out at step S3 of FIG. 26 is described with reference to a flow chart of FIG. 28.

At step S31, the reception unit 111 receives a signal representative of packet data transmitted thereto from the transmission block 22. The processes at steps S31 to S36 are carried out in parallel by the signal processing sections 102-0 to 102-N.

At step S32, the clock production unit 112 detects an edge of the signal supplied thereto from the reception unit 111 to establish bit synchronism. The synchronization unit 113 carries out sampling of the signal received by the reception unit 111 and outputs packet data to the symbol synchronization unit 114.

At step S33, the symbol synchronization unit 114 detects controlling codes included in the packet data to establish symbol synchronism.

At step S34, the 10B8B symbol decoder 115 carries out 10B8B conversion for the packet data after the symbol synchronization and outputs the packet data after the conversion into data of a unit of 8 bits.

At step S35, the skew correction unit 116 detects Deskew Code and corrects Data Skew between the lanes such that the timing of Deskew Code is adjusted to the timing represented by the information supplied from the PHY-RX state controlling section 101.

At step S36, the controlling code removal unit 117 removes the controlling codes added to the packet data.

At step S37, the lane integration section 122 integrates the packet data supplied thereto from the signal processing sections 102-0 to 102-N.

At step S38, the packet separation section 123 separates the packet data integrated by the lane integration section 122 into packet data which configure the header data and packet data which configure the payload data.

At step S39, the header error correction unit 132 carries out error detection arithmetic operation using the CRC code for each set of header information and a CRC code included in the header data separated by the packet separation section 123. Further, the header error correction unit 132 selects header information free from an error based on an error detection result of the sets, and a comparison result of the data determined by the error detection arithmetic operation, and outputs the error-free header information.

At step S40, the Byte to Pixel conversion section 125 carries out Byte to Pixel conversion of the payload data and outputs pixel data of a unit of 10 bits, 12 bits, 14 bits or 16 bits. For the payload data which are made an object of the Byte to Pixel conversion, error correction using the parity is carried out suitably by the payload error correction section 124.

When the processing of pixel data for one line ends, the processing returns to step S3 of FIG. 26 such that the processes at the steps beginning with step S3 are carried out.

The data transmission between the image sensor 11 and the DSP 12 is carried out using a packet format wherein one line of one frame corresponds to one packet in such a manner as described above.

The packet format used for data transmission between the image sensor 11 and the DSP 12 can be regarded as a format which suppresses transmission of header information and a controlling code indicative of a packet boundary such as Start Code and End code to the minimum, and can prevent a drop of the transmission efficiency. If a packet format wherein the amount of pixel data placed in the payload of one packet is smaller than that of one line is adopted, then in order to transmit full pixel data of one frame, it is necessary to transmit a greater number of packets. Then, as the number of pieces of header information and controlling codes to be transmitted increase, the transmission efficiency drops.

Further, it becomes possible to suppress the transmission latency by preventing the drop of the transmission efficiency, and an interface of a high pixel rate and a high frame rate where it is necessary to transmit a large amount of image data at a high speed can be implemented.

By adopting the packet format which presupposes that the reliability/redundancy of transmission is raised and error correction is carried out by the reception block 31 side, it is possible to assure a transmission error countermeasure of header information. Since transmission of synchronism information of Frame/Line (V/H) and so forth is carried out using header information, if the header information is lost by a transmission error, then there is the possibility that the system may suffer from a significant fault. However, such a situation can be prevented.

Also it is possible to suppress increase of the installation cost or the power consumption for assuring a transmission error countermeasure of header information. In particular, according to the packet format used for data transmission between the image sensor 11 and the DSP 12, since a CRC code is added, it is possible for the DSP 12 to detect whether or not header information includes a transmission error. Further, by transmitting three sets of header information and a CRC code, when a transmission error of header information occurs, the DSP 12 can correct the header information to correct information.

If it is assumed that an error correction code is used as a transmission error countermeasure of header information, then it is necessary to prepare a circuit, which carries out calculation of an error correction code in the transmission block 22 and prepare a circuit which carries out error correction arithmetic operation in the reception block 31. Since a CRC code which is an error detection code is added to header information, the circuit scale and the power consumption can be reduced in comparison with an alternative case in which a circuit for carrying out arithmetic operation relating to error correction is prepared. Further, when an error of header information is detected, since the reception block 31 does not request the transmission block 22 to re-send the header information, there is no necessity to prepare a transmission line for the reverse direction for the re-sending request.

By raising the redundancy and combining a plurality of K Characters of the 8B10B code to configure a controlling code, the error probability of the controlling code can be reduced. Consequently, it is possible to assure a transmission error countermeasure for controlling codes by a comparative simple circuit.

In particular, although four symbols of three kinds of K Character are used in combination for Start Code, if at least the symbols other than K28.5 can be detected, then the reception block 31 can specify Start Code. Therefore, it can be considered that the resisting property to a transmission error is high. This similarly applies also to End Code.

Further, although four kinds of K Character are used in combination for Pad Code, by allocating a greater number of kinds of K Character than that of the other controlling codes, it is possible to make the error resisting property higher than that of the other controlling codes. In particular, if a symbol of one kind from among the four kinds can be detected, then the reception block 31 can specify Pad Code. Since Pad Code is higher in transmission frequency than Start Code or End Code, it is provided with the structure which can assure a higher error resisting propriety.

Further, even in the case where the same controlling code is transmitted at the same timing through the individual lanes and a transmission error occurs with one of the lanes, resulting in loss of the controlling code, it is possible to use the controlling code of the other lanes to reproduce the controlling code with which the error has occurred.

Further, since the number of K Characters is limited, a minimum number of Characters are combined to configure each controlling code. For example, for Sync Code, Deskew Code and Standby Code which can comparatively permit a transmission error by repetitive transmission, such a data structure which does not require additional allocation of K Character is used.

Since a controlling code necessary for re-synchronization is allocated to each one packet, that is, to each one line, when bit synchronism is lost by a disturbance such as static electricity or noise, re-synchronism can be established rapidly. Further, the influence of a transmission error by loss of synchronism can be suppressed to a minimum.

In particular, in the CDR implemented by the clock production unit 112 and the synchronization unit 113, it is possible to establish bit synchronism by detecting a transition/edge of bit data after 8B10B conversion. If the transmission block 22 continues to send data, then bit synchronism can be established within a period estimated as CDR lock time.

Further, even in the case where symbol synchronism is lost, re-synchronization can be carried out rapidly by the symbol synchronization unit 114 detecting particular K Character (K28.5). Since K28.5 is used in Start Code, End Code and Deskew Code, symbol synchronism can be established at three places within a transmission period of packet data for one packet.

Further, by making it possible to correct Data Skew between the lanes using Deskew Code, also it is possible to establish synchronism between the lanes.

By configuring the link layer such that packet data are processed in parallel in a unit of a group of 16 data, in the case of the example of FIG. 14, in a unit of 16 bytes, the circuit scale or the memory amount can be suppressed in comparison with an alternative case in which packet data are processed one by one in a period of one clock. In regard to mounting, between processing of packet data one by one and collective processing of a predetermined number of units, the latter can suppress the circuit scale and so forth. Since the circuit scale can be suppressed, also it is possible to suppress the power consumption.

Further, by allocating, upon lane allocation, successive packet data to different lanes, the error resisting property can be enhanced. Even if an error occurs across a number of successive packet data exceeding an error correction capacity of a parity in a certain lane, if lane coupling is carried out by the reception block 31, then positions of packet data at which the error occurs disperse, and this sometimes make error correction using a parity possible. The error correction capacity by a parity depends upon the parity length.

Further, by carrying out an ECC process at a higher order than lane distribution and lane integration where an order nearer to the physical layer is a lower order, the circuit scale of the transmission block 22 and the reception block 31 can be reduced. For example, if the transmission block 22 inserts a parity of an ECC into the payload after allocation of packet data to lanes is carried out, then it is necessary to prepare a payload ECC insertion section for each lane, resulting in increase of the circuit scale. However, such a situation as just described can be prevented.

Although, in the physical layer, parallel processing of packet data is carried out by a plurality of circuits, if the PHY-TX state controlling section 81 and the clock production section 82 are used commonly, then simplification of the circuitry can be achieved in comparison with an alternative case wherein those circuits are prepared for each lane. Further, by using a protocol which does not transmit controlling codes by different lanes, simplification of the circuit which processes packet data of the lanes can be anticipated.

<Changeover of the Lane Number>

Transmission of the same controlling code at the same timing through the lanes is carried out not only upon ordinary data transmission but also, for example, upon changeover of the number of lanes. Also in the case where the number of lanes is changed over, those of the lanes which are active, that is, which are used for data transmission, have the same state.

Figure 29:
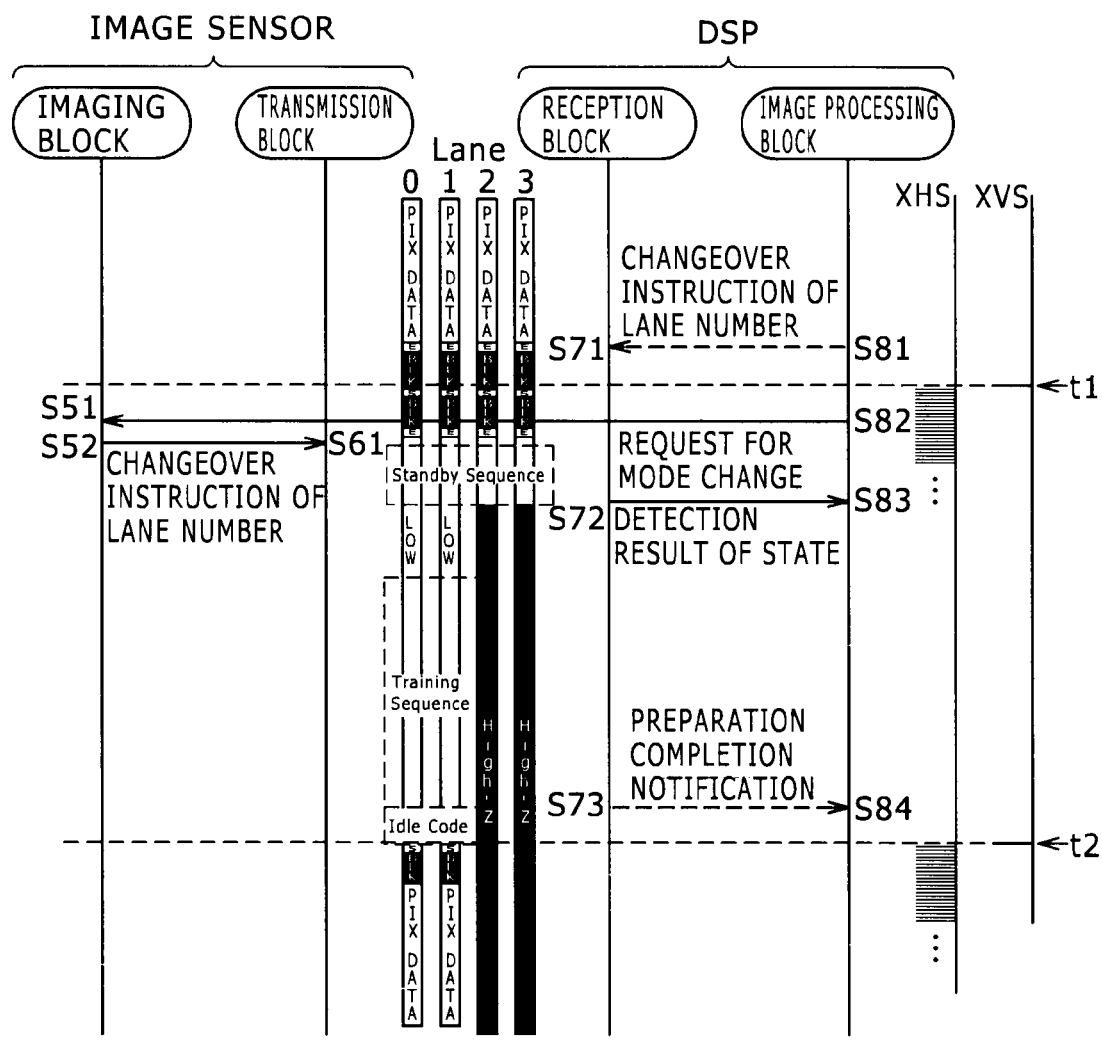
FIG. 29 is a sequence diagram illustrating a controlling sequence in the case where the lane number is changed over.

FIG. 29 illustrates a controlling sequence in the case where the lane number is changed over.

On the right side in FIG. 29, timings of a vertical synchronizing signal XVS and a horizontal driving signal XHS are illustrated. Image data of lines which configure an image of one frame are transmitted in accordance with the horizontal synchronizing signal within a period till time t1 at which the vertical synchronizing signal is detected. Then at the timing of time t1, the number of active lanes is changed from four lanes to two lanes. This is described more particularly. It is to be noted that, up to time t1, data transmission is carried out using four lanes.

A state of the lanes is illustrated in a vertical direction substantially in the middle of FIG. 29. "PIX DATA" represents that transmission of pixel data is carried out through a lane to which the characters are applied. "E," "BLK" and "S" following "PIX DATA" represent Frame End, a blanking period and Frame Start, respectively.

If transmission of pixel data of a frame to be transmitted ends in a frame period till time t1, then the image processing block 32 instructs the reception block 31 to change over the lane number from 4 to 2 at step S81. The instruction from the image processing block 32 is received by the reception block 31 at step S71.

Then, when time t1 comes, the image processing block 32 issues a mode change request to the imaging section 21 of the image sensor 11 at step S82. The mode change request transmitted to the imaging block 21 includes also information representing that the lane number is to be changed over from 4 to 2. Though not shown in FIG. 1 and so forth, a transmission line for transmitting information on preset values regarding imaging such as a shutter speed and a gain from the image processing block 32 to the imaging block 21 is provided. Also the mode change request is transmitted to the imaging block 21 through this transmission line.

At step S51, the imaging block 21 receives the mode change request from the image processing block 32 and issues an instruction to change over the lane number from 4 to 2 to the transmission section 22 at step S52. The instruction from the imaging block 21 is received by the transmission block 22 at step S61.

A process of Standby Sequence is carried out between the transmission block 22 and the reception block 31, and Standby Code is repetitively transmitted from the transmission block 22 to the reception block 31 using the lanes Lane0 to Lane3. When the Standby Sequence process ends the lanes Lane0 and Lane1 which maintain the active state have the Low state while the lanes Lane2 and Lane3 which end the data transmission have a High-Z state.

Between the transmission block 22 and the reception block 31, a process of Training Sequence is carried out, and Sync Code is repetitively transmitted from the transmission block 22 to the reception block 31 using the lanes Lane0 and Lane1. In the reception block 31, bit synchronism is assured, and symbol synchronism is assured by detection of Sync Code.

When the Training Sequence process ends, the reception block 31 notifies the image processing block 32 that the preparations are completed at step S73. The notification from the reception block 31 is received by the image processing block 32 at step S84, and the controlling sequence when the lane number is to be changed over ends therewith.

In this manner, in the controlling sequence for changing over the lane number, also the lanes Lane2 and Lane3 which end the data transmission transmit Standby Code upon processing of Standby Sequence so that they may have a state same as that of the lanes Lane0 and Lane1 which are used for data transmission continuously. Although it seems a possible idea, for example, for the lanes Lane2 and Lane3 to remain in the High-Z state as they are without carrying out transmission of Standby Code, they come to have a state different from those lanes which are used for data transmission continuously, resulting in complication in control.

<Example of the Configuration of Computer>

While the series of processes described above can be executed by hardware, it may otherwise be executed by software. In the case where the series of processes is executed by software, a program which constructs the software is installed from a program recording medium into a computer incorporated in hardware for exclusive use, a personal computer for universal use, and so forth.

Figure 30:
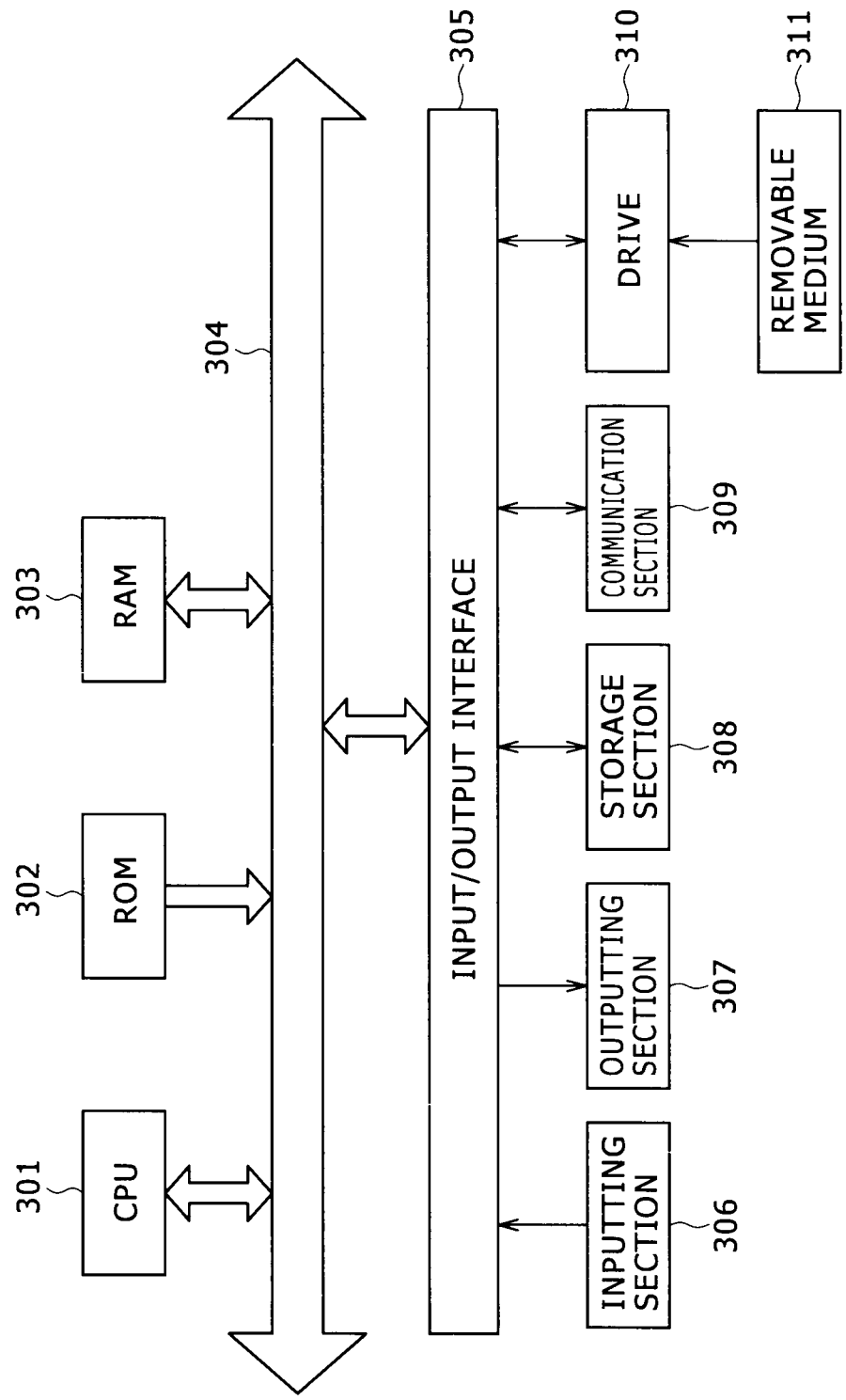
FIG. 30 is a block diagram showing an example of a hardware configuration of a computer.

FIG. 30 shows an example of a hardware configuration of a computer which executes the series of processes described hereinabove in accordance with a program.

Referring to FIG. 30, in the computer shown, a central processing unit (CPU) 301, a read only memory (ROM) 302 and a random access memory (RAM) 303 are connected to one another by a bus 304.

Further, an input/output interface 305 is connected to the bus 304. An inputting section 306 including a keyboard, a mouse and so forth, and an outputting section 307 including a display unit, a speaker and so forth are connected to the input/output interface 305. Also, a storage section 308 formed from a hard disk, an nonvolatile memory, or the like, a communication section 309 formed from a network interface or the like, and a drive 310 for driving a removable medium 311 are connected to the input/output interface 305.

In the computer configured in such a manner as described above, the CPU 301 loads a program stored, for example, in the storage section 308 into the RAM 303 through the input/output interface 305 and the bus 304 and executes the program to carry out the series of processes described above.

The program to be executed by the CPU 301 can be recorded on and provided as, for example, a removable medium 311 or can be provided through a wire or wireless transmission medium such as a local area network, the Internet or a digital broadcast, and installed into the storage section 308.

It is to be noted that the program to be executed by the computer may be of the type by which the processes are carried out in a time series in the order as described in the present specification or of the type by which the processes are executed in parallel or executed individually at necessary timings such as when the process is called.

While a preferred embodiment of the disclosed technology has been described using specific terms, such description is for illustrative purpose, and it is to be understood that changes and variations may be made without departing from the spirit or scope of the following claims.

The present application contains subject matter related to that disclosed in Japanese Priority Patent Application JP 2010-254261 filed in the Japan Patent Office on Nov. 12, 2010, the entire content of which is hereby incorporated by reference.

What is claimed is:

1. An image outputting apparatus, comprising:
an imaging circuit;
a header production circuit that produces a header including header information and an error detection code, the header information formed from
first frame information that indicates whether pixel data is included in a payload are pixel data of a first line of one frame,
second frame information that indicates whether the pixel data is included in the payload are pixel data of a last line of one frame,
first line information that indicates whether the pixel data is included in the payload are data of valid pixels, and
second line information that indicates a line number of a line formed from the pixel data included in the payload, and
the error detection code for detection of an error of the header information;
a packet production circuit that produces a packet which includes, in the payload thereof, pixel data for one line which configure an image obtained by imaging by said imaging circuit and to which the header is added;
an addition circuit that adds, to the front of the packet produced by said packet production circuit, a start code that indicates a start position of the packet and adds, to the tail end of the packet, an end code that indicates an end position of the packet; and
an outputting circuit that outputs the packet produced by said packet production circuit to an image processing apparatus.

2. The image outputting apparatus according to claim 1, wherein
each of the first frame information, the second frame information and the first line information is 1-bit information, and
the second line information is 13-bit information.

3. The image outputting apparatus according to claim 1, wherein said header production circuit produces the header which includes a plurality of sets of the header information and the error detection code.

4. The image outputting apparatus according to claim 1, wherein said addition circuit adds a padding code to the payload of the packet when a transmission rate of data through a transmission line between said image outputting apparatus and the image processing apparatus is higher than a transmission rate of the pixel data at which the pixel data are outputted from said imaging circuit.

5. The image outputting apparatus according to claim 4, wherein
said addition circuit adds a skew code, which is to be used by the image processing apparatus, next to the end code to synchronize data of the packet transmitted through a plurality of transmission lines, and
said outputting circuit outputs data of the packet to which the start code, end code and skew code are added simultaneously to the image processing apparatus using the plural transmission lines.

6. The image outputting apparatus according to claim 5, wherein said addition circuit
combines, from among a plurality of symbols which are known information and are each configured from a sequence of a predetermined number of bits, four symbols of three kinds of the symbols to produce the start code and the end code and adds the start code and the end code to the packet,
combines, from among the plural symbols, four symbols of the four kinds of the symbols to produce the padding code and adds the padding code to the payload of the packet, and
combines predetermined two ones of the plural symbols to produce the skew code and adds the skew code to the packet.

7. The image outputting apparatus according to claim 6, wherein said addition circuit produces the start code, end code and skew code such that the symbols of the start code, end code and skew code include those ones which are of the same kind.

8. The image outputting apparatus according to claim 5, further comprising:
a distribution circuit that allocates the data of the packet produced by said packet production circuit to the plural transmission lines, and
a number of such addition circuits and outputting circuits equal to the number of the transmission lines being provided corresponding to the transmission lines.

9. An image outputting method, comprising:
picking up an image;
producing, by circuitry, a header including header information and an error detection code, the header information formed from
first frame information that indicates whether pixel data is included in a payload are pixel data of a first line of one frame,
second frame information that indicates whether the pixel data is included in the payload are pixel data of a last line of one frame,
first line information that indicates whether the pixel data is included in the payload are data of valid pixels, and
second line information that indicates a line number of a line formed from the pixel data included in the payload, and
the error detection code for detection of an error of the header information;
producing, by the circuitry, a packet which includes, in the payload thereof, pixel data for one line which configure an image obtained by the imaging and to which the header is added;
adding, by the circuitry, to the front of the packet produced by the circuitry, a start code that indicates a start position of the packet and adds, to the tail end of the packet, an end code that indicates an end position of the packet; and
outputting the produced packet to an image processing apparatus.

10. A non-transitory computer readable medium storing a program that, when executed by a computer, causes the computer to:
pick up an image;
produce a header including header information and an error detection code, the header information formed from
first frame information that indicates whether pixel data is included in a payload are pixel data of a first line of one frame,
second frame information that indicates whether the pixel data is included in the payload are pixel data of a last line of one frame,
first line information that indicates whether the pixel data is included in the payload are data of valid pixels, and second line information that indicates a line number of a line formed from the pixel data included in the payload, and the error detection code for detection of an error of the header information;

produce a packet which includes, in the payload thereof, pixel data for one line which configure an image obtained by the imaging and to which the header is added;

add to the front of the packet produced by the circuitry, a start code that indicates a start position of the packet and adds, to the tail end of the packet, an end code that indicates an end position of the packet; and output the produced packet to an image processing apparatus.

11. A non-transitory computer readable medium that stores a data structure of transmission data to be used by a computer for transmission of data including pixel data for one line which configure an image obtained by imaging, the data structure comprising:

a packet wherein a header including header information and an error detection code, the header information formed from first frame information that indicates whether pixel data is included in a payload are pixel data of a first line of one frame, second frame information that indicates whether the pixel data is included in the payload are pixel data of a last line of one frame, first line information that indicates whether the pixel data is included in the payload are data of valid pixels, and second line information that indicates a line number of a line formed from the pixel data included in the payload, and the error detection code for detection of an error of the header information, the error detection code added to the payload which includes pixel data for one line which configure an image obtained by imaging;

a start code added to a front of the packet and indicates a start position of the packet;

an end code added to a tail end of the packet and indicates an end position of the packet; and a skew code added next to the end code and used by an image processing apparatus which receives the data of the packet to synchronize the data of the packet.

12. An image processing apparatus, comprising:

a reception circuit that receives a packet produced by an image outputting apparatus provided in the same apparatus and outputted from the image outputting apparatus, the packet including a header added to a payload including image data for one line which configure an image obtained by imaging by an imaging circuit of the image outputting apparatus, the header including header information and an error detection code, the header information formed from first frame information that indicates whether pixel data is included in a payload are pixel data of a first line of one frame, second frame information that indicates whether the pixel data is included in the payload are pixel data of a last line of one frame, first line information that indicates whether the pixel data is included in the payload are data of valid pixels, and second line information that indicates a line number of a line formed from the pixel data included in the payload, and the error detection code for detection of an error of the header information; and an image processing circuit that processes the image configured from lines each formed from the pixel data included in the payload of the packet received by said reception circuit, wherein the packet received by the reception circuit further includes a start code, at the front of the packet, that indicates a start position of the packet and an end code, at a tail end of the packet, that indicates an end position of the packet, and an addition circuit of the image outputting apparatus adds the start code and the end code to the packet prior to output by the image outputting apparatus.

13. The image processing apparatus according to claim 12, wherein the header includes a plurality of sets of the header information and the error detection code;

said image processing apparatus further comprising:

an error detection circuit that detects an error of the header information in each of the sets based on the error detection code which configures the set to which the header information belongs; and a production circuit that produces the image of one frame formed from the pixel data included in the payload based on the header information from which an error is not detected by said error detection circuit;

said image processing circuit processes the image produced by said production circuit.

14. The image processing apparatus according to claim 12, wherein said reception circuit receives data after the start code is received until the end code is received as the data of the packet.

15. The image processing apparatus according to claim 14, further comprising:

a removal circuit that removes the start code and the end code and removes a padding code added to the payload by the image outputting apparatus when a transmission rate of a transmission line between the image outputting apparatus and said image processing apparatus is higher than a transmission rate of pixel data of the image outputted from the imaging circuit of the image outputting apparatus.

16. The image processing apparatus according to claim 14, wherein data of the packet having a skew code added next to the end code thereof such that the start code, end code and skew code are added to the packet are outputted simultaneously using a plurality of such transmission lines from the image outputting apparatus;

said image processing apparatus further comprising:

a correction circuit that corrects a displacement in reception timing of the data received by said reception circuit based on the skew code;

a number of such reception circuits, correction circuits and removal circuits equal to the number of transmission lines being provided corresponding to the transmission lines.

17. The image processing apparatus according to claim 16, wherein, by the image outputting apparatus, from among a plurality of symbols which are known information and are each configured from a sequence of a predetermined number of bits, four symbols of three kinds of the symbols are combined to produce the start code and the end code and adds the start code and the end code to the packet, from among the plural symbols, four symbols of the four kinds of the symbols are combined to produce the padding code and adds the padding code to the payload of the packet, and predetermined two ones of the plural symbols are combined to produce the skew code and adds the skew code to the packet.

18. The image processing apparatus according to claim 17, wherein, by the image outputting apparatus, the start code, end code and skew code are produced such that the symbols of the start code, end code and skew code include those ones which are of the same kind.

19. An image processing method for an image processing apparatus, comprising:

receiving, by circuitry, a packet produced by an image outputting apparatus provided in the same apparatus in which the image processing apparatus is provided and outputted from the image outputting apparatus, the packet including a header added to a payload including image data for one line which configure an image obtained by imaging by an imaging circuit of the image outputting apparatus, the header including header information and an error detection code, the header information formed from first frame information that indicates whether pixel data is included in a payload are pixel data of a first line of one frame, second frame information that indicates whether the pixel data is included in the payload are pixel data of a last line of one frame, first line information that indicates whether the pixel data is included in the payload are data of valid pixels, and second line information that indicates a line number of a line formed from the pixel data included in the payload, and the error detection code for detection of an error of the header information; and processing, by the circuitry, the image configured from lines each formed from the pixel data included in the payload of the received packet, wherein the packet received by the reception circuit further includes a start code, at the front of the packet, that indicates a start position of the packet and an end code, at a tail end of the packet, that indicates an end position of the packet, and an addition circuit of the image outputting apparatus adds the start code and the end code to the packet prior to output by the image outputting apparatus.

20. A non-transitory computer readable medium storing a program that, when executed by a computer, causes the computer to:

receive a packet produced by an image outputting apparatus provided in the same apparatus in which the image processing apparatus is provided and outputted from the image outputting apparatus, the packet including a header added to a payload including image data for one line which configure an image obtained by imaging by an imaging circuit of the image outputting apparatus, the header including header information and an error detection code, the header information formed from first frame information that indicates whether pixel data is included in a payload are pixel data of a first line of one frame, second frame information that indicates whether the pixel data is included in the payload are pixel data of a last line of one frame, first line information that indicates whether the pixel data is included in the payload are data of valid pixels, and second line information that indicates a line number of a line formed from the pixel data included in the payload, and the error detection code for detection of an error of the header information; and process the image configured from lines each formed from the pixel data included in the payload of the received packet, wherein the packet further includes a start code, at the front of the packet, that indicates a start position of the packet and an end code, at a tail end of the packet, that indicates an end position of the packet, and an addition circuit of the image outputting apparatus adds the start code and the end code to the packet prior to output by the image outputting apparatus.

21. An imaging apparatus, comprising:

an image outputting apparatus; and an image processing apparatus;

said image outputting apparatus including an imaging circuit;

a header production circuit that produces a header including header information and an error detection code, the header information formed from first frame information that indicates whether pixel data is included in a payload are pixel data of a first line of one frame, second frame information that indicates whether the pixel data is included in the payload are pixel data of a last line of one frame, first line information that indicates whether the pixel data is included in the payload are data of valid pixels, and second line information that indicates a line number of a line formed from the pixel data included in the payload, and the error detection code for detection of an error of the header information;

a packet production circuit that produces a packet which includes, in the payload thereof, pixel data for one line which configure an image obtained by imaging by said imaging circuit and to which the header is added;

an addition circuit that adds, to the front of the packet produced by said packet production circuit, a start code that indicates a start position of the packet and adds, to the tail end of the packet, an end code that indicates an end position of the packet; and an outputting circuit that outputs the packet produced by said packet production circuit to an image processing apparatus; and said image processing apparatus including a reception circuit that receives the packet; and an image processing circuit that processes the image configured from lines each formed from the pixel data included in the payload of the packet received by said reception circuit.

* * * * *